(12) United States Patent
Izumi

(10) Patent No.: US 9,354,483 B2
(45) Date of Patent: May 31, 2016

(54) OPTICAL LIMITER, OPTICAL LOGIC CIRCUIT, COMPARATOR, DIGITAL CONVERTER, OPTICAL TRANSMISSION APPARATUS AND OPTICAL PROCESSING METHOD

(71) Applicant: FUJITSU LIMITED, Kawasaki-shi, Kanagawa (JP)

(72) Inventor: Futoshi Izumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/561,778

(22) Filed: Dec. 5, 2014

(65) Prior Publication Data
US 2015/0168804 A1  Jun. 18, 2015

(30) Foreign Application Priority Data
Dec. 16, 2013  (JP) .................. 2013-259675

(51) Int. Cl.
*G02F 1/295* (2006.01)
*G02F 1/35* (2006.01)
*G02F 1/29* (2006.01)

(52) U.S. Cl.
CPC .............. *G02F 1/3521* (2013.01); *G02F 1/293* (2013.01); *G02F 2203/52* (2013.01)

(58) Field of Classification Search
CPC ................................ G02F 1/293; G02F 1/3521
See application file for complete search history.

(56) References Cited

U.S. PATENT DOCUMENTS

| 4,597,638 A * | 7/1986 | Chemla | B82Y 20/00 359/244 |
| 4,626,075 A * | 12/1986 | Chemla | B82Y 20/00 359/244 |
| 6,885,790 B2 * | 4/2005 | McCoy | B82Y 20/00 385/129 |
| 2004/0033045 A1 | 2/2004 | Oto et al. | |
| 2010/0021105 A1 | 1/2010 | Watanabe | |
| 2010/0220997 A1 | 9/2010 | Futami | |

FOREIGN PATENT DOCUMENTS

| JP | 1-210938 | 8/1989 |
| JP | 2000-31901 | 1/2000 |

OTHER PUBLICATIONS

Murata et al., "Light-Induced Index Change in a Waveguide of a Novel Organic Quinoid Dye and its Applications to All-Optical Devices with Localized Nonlinearity" IEEE Conference Publications Nonlinear Optics, Aug. 13, 1998, pp. 313-315.
Extended European Search Report dated Aug. 17, 2015 in corresponding European Patent Application No. 14196515.2.
Wang et al., "A study on diffraction efficiency of an adaptive optical limiter based on nonlinear medium sandwiched structure", Optics & Laser Technology, vol. 51, 2013, pp. 72-76.

* cited by examiner

*Primary Examiner* — Omar R Rojas
(74) *Attorney, Agent, or Firm* — Staas & Halsey LLP

(57) ABSTRACT

An optical limiter includes a nonlinear medium that changes its own refractive index in accordance with an intensity of incident light, and outputs the incident light in a different direction depending on the refractive index, a first incident section by which reference light with a predetermined intensity and an optical signal with a modulated intensity is made incident on the nonlinear medium, a second incident section by which auxiliary light is made incident on a portion in the nonlinear medium through which the reference light and the optical signal pass, and an inverse output section that is provided at an incident position of the reference light outputted from the nonlinear medium when the optical signal is off, and outputs an optical signal obtained by inversion of the intensity of the incident light.

13 Claims, 24 Drawing Sheets

OPTICAL LIMITER, OPTICAL LOGIC CIRCUIT, COMPARATOR, DIGITAL CONVERTER, OPTICAL TRANSMISSION APPARATUS AND OPTICAL PROCESSING METHOD

CROSS-REFERENCE TO RELATED APPLICATION

This application is based on and claims the benefit of priority from the prior Japanese Patent Application No. 2013-259675 filed on Dec. 16, 2013, the entire contents of which are incorporated herein by reference.

FIELD

The embodiments discussed herein are related to an optical limiter, an optical logic circuit, a comparator, a digital converter, an optical transmission apparatus, and an optical processing method.

BACKGROUND

Conventionally, known is an optical limiter circuit that limits the light intensity of a light wave propagating in an optical transmission line so as not to exceed a certain level. For example, in terms of an optical limiter to which a nonlinear phenomenon is applied, known is an optical limiter that uses a nonlinear phenomenon which a nonlinear medium having a large third-order nonlinear susceptibility and a linear medium such as a quartz waveguide cause while being in contact with each other.

Moreover, in terms of an optical limiter to which four wave mixing is applied, known is an optical limiter to which an optical parametric effect is applied. Moreover, in terms of a waveguide type light modulating switching device using a nonlinear organic dye, known is a structure of a light waveguide in which a dye thin film is vapor deposited on a base glass waveguide to form a nonlinear waveguide, so that a composite optical system of a linear optical material and a nonlinear optical material is created. These techniques are disclosed, for example, in Japanese Laid-open Patent Publication Nos. 01-210938 and 2000-031901, and Hiroshi MURATA, Masayuki IZUTSU, "Light-Induced Index Change in a Waveguide of a Novel Organic Quinoid Dye and its Applications to All-Optical Devices with Localized Nonlinearity", IEEE Conference Publications Nonlinear Optics '98, Aug. 1998, PP. 313 to 315.

SUMMARY

According to an aspect of the invention, an optical limiter includes a nonlinear medium that changes its own refractive index in accordance with an intensity of incident light, and outputs the incident light in a different direction depending on the refractive index, a first incident section by which reference light with a predetermined intensity and an optical signal with a modulated intensity is made incident on the nonlinear medium, a second incident section by which auxiliary light is made incident on a portion in the nonlinear medium through which the reference light and the optical signal pass, and an inverse output section that is provided at an incident position of the reference light outputted from the nonlinear medium when the optical signal is off, and outputs an optical signal obtained by inversion of the intensity of the incident light. includes The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, first to fifth embodiments of an optical limiter, an optical logic circuit, a comparator, a digital converter, an optical transmission apparatus, and an optical processing method according to the present disclosure will be explained in details with reference to the drawings.

(First Embodiment)

(Configuration Example of Optical Limiter)

Figure 1:
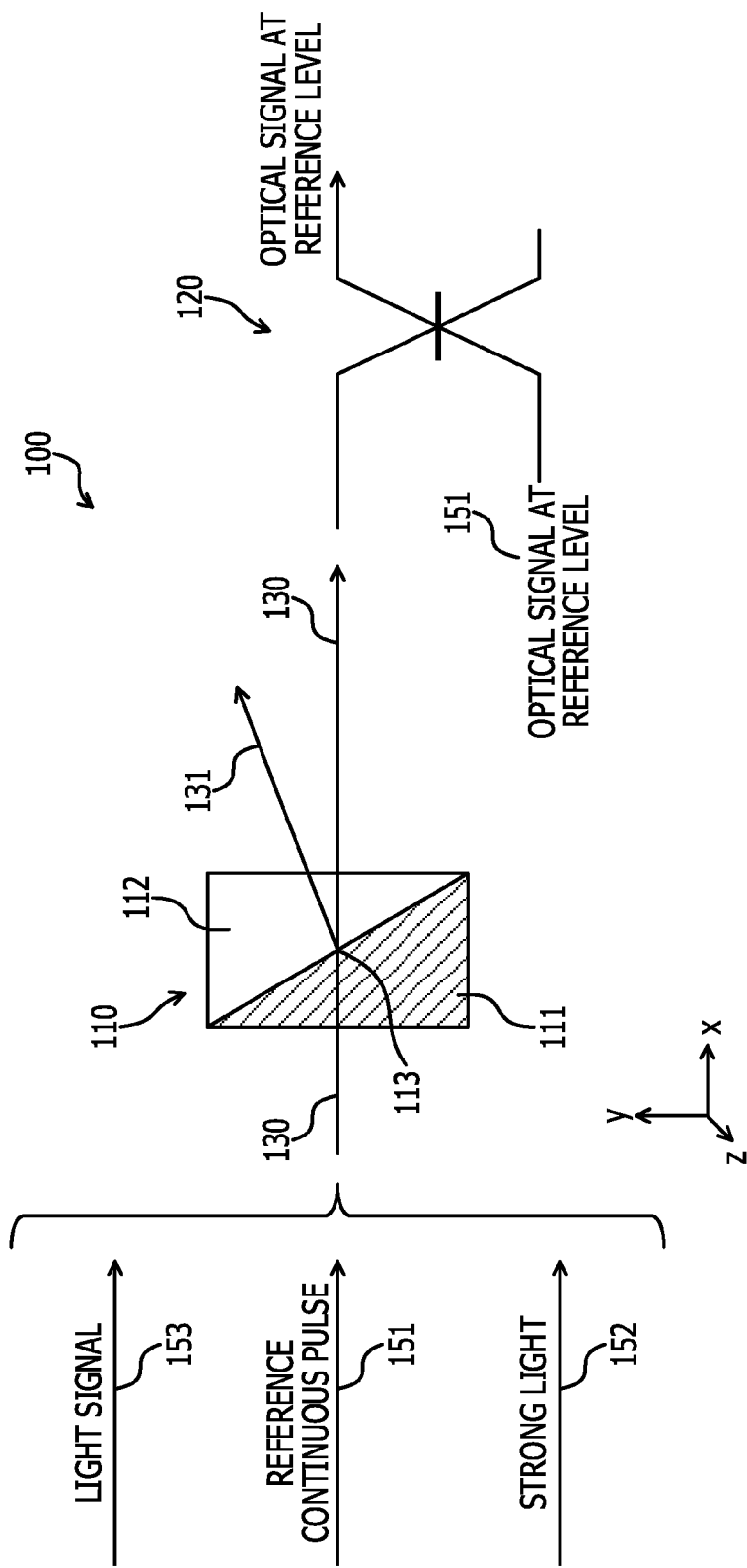
FIG. 1 is an explanation view illustrating a configuration example of an optical limiter according to a first embodiment.

FIG. 1 is an explanation view illustrating a configuration example of an optical limiter according to a first embodiment. In FIG. 1, an optical limiter 100 includes a waveguide medium 110, and a half mirror section 120. The waveguide medium 110 includes a nonlinear medium 111 and a linear medium 112.

The optical limiter 100 is an optical limiter that suppresses the level of an optical signal 152 to a predetermined level (hereinafter, referred to as reference level) or lower. The nonlinear medium 111 changes its own refractive index in accordance with the intensity of incident light, and outputs the incident light in a different direction depending on the refractive index. The nonlinear medium 111 is a medium that has a large nonlinear effect of a refractive index N1.

The linear medium 112 has a smaller nonlinear effect than the nonlinear medium 111, and is disposed in series in a post stage of the nonlinear medium 111. The linear medium 112 is a medium that has a small nonlinear effect of a refractive index N2, for example. The linear medium 112 supports the nonlinear medium 111 to be fixed, forms a waveguide, and outputs light in the parallel direction with the incident light.

The waveguide medium 110 includes the nonlinear medium 111 and the linear medium 112 that are adjacent to each other and disposed in series, and light is incident in the parallel direction with an x-axis direction in FIG. 1. The waveguide medium 110 includes a boundary surface 113 (reflection surface) that serves as a boundary between the nonlinear medium 111 and the linear medium 112. The boundary surface 113 includes a surface that is not vertical to an optical path 130 (x-axis direction) of light incident on the waveguide medium 110. In other words, the boundary surface 113 includes a surface that is not in parallel with a y-axis direction.

Light including a reference continuous pulse 151, the optical signal 152, and strong light 153 is incident on the waveguide medium 110. The reference continuous pulse 151 is a continuous pulse at a level twice the reference level. Further, the reference continuous pulse 151 is not limited to the continuous pulse, but continuous wave (CW) light can be used.

The optical signal 152 is light with a modulated intensity, and a uniformed pulse of a level different from the reference level. The optical signal 152 is a signal indicating three levels, for example, "0", "1", and "2". The optical signal 152 is divided with the optical frequency of a prism or the like, and the optical signal 152 being specially divided is incident on the optical limiter 100. Further, the optical signal 152 may be a non-uniform pulse.

The reference continuous pulse 151 and the optical signal 152 both have the same wavelength, for example. The reference continuous pulse 151 and the optical signal 152 are both incident on a same position in the nonlinear medium 111. The optical limiter 100 has a function as a first incident section by which the reference continuous pulse 151 with a predetermined intensity and the optical signal 152 with a modulated intensity is made incident on the nonlinear medium 111.

The strong light 153 is one example of auxiliary light, for example, a continuous pulse with a high intensity of which wavelength or polarization direction is different from that of the reference continuous pulse 151 and the optical signal 152, and is light that can be divided later. The strong light 153 is incident on the nonlinear medium 111 in the same direction as the incident direction of the reference continuous pulse 151 and the optical signal 152. The strong light 153 is light for making a nonlinear effect of the optical signal 152 apparent.

The strong light 153 is not limited to the continuous pulse, but CW light can be used. The strong light 153 may be, when the polarization direction of the reference continuous pulse 151 and the optical signal 152 is unchangeable, light of which polarization direction is different from that of the reference continuous pulse 151 and the optical signal 152. The optical limiter 100 has a function as a second incident section by which the auxiliary light is made incident on a portion through which the reference continuous pulse 151 and the optical signal 152 in the nonlinear medium 111 pass.

The nonlinear effect indicates that, for example, the intensity of incident light is changed to change the refractive index, thereby changing the waveform and the direction of the light. In a medium having a small nonlinear effect such as the linear medium 112, even when the intensity of incident light is changed, the traveling direction of the light is hardly changed. In contrast, in the nonlinear medium 111 having a large nonlinear effect, when the intensity of incident light is changed, the traveling direction of the light is changed.

In the optical limiter 100, when light with a predetermined intensity is made incident on the waveguide medium 110, the light travels straight ahead on the optical path 130 with no change in the traveling direction of the light in the boundary surface 113. In contrast, when light with an intensity other than the predetermined intensity is made incident on the waveguide medium 110, the light deflects from the optical path 130 in the boundary surface 113, and travels straight ahead on an optical path 131, for example.

The predetermined intensity is the intensity of light of the reference continuous pulse 151 and the strong light 153. In other words, when the optical signal 152 is not incident and is in an off state while light of the reference continuous pulse 151 and the strong light 153 are incident on the waveguide medium 110, the light is not reflected off the boundary surface 113, but travels straight ahead on the optical path 130 without any change.

The waveguide medium 110 is configured such that a light-incident surface of the nonlinear medium 111 on which light is incident and a light-output surface of the linear medium 112 from which light is outputted are in parallel with each other, for example. Moreover, the boundary surface 113 is configured such that surfaces of the nonlinear medium 111 and the linear medium 112 that face are in parallel with each other. In addition, the nonlinear medium 111 refracts light with the same refractive index as a refractive index of the linear medium 112 in a state where the reference continuous pulse 151 and the strong light 153 are incident when the optical signal 152 is off.

Such a configuration enables the linear medium 112 to output light, which is outputted from the nonlinear medium 111 when the optical signal 152 is off, in the parallel direction with the incident direction of light incident on the nonlinear medium 111. Moreover, the linear medium 112 is disposed in contact with the nonlinear medium 111. This allows the light outputted from the linear medium 112 to be directed in the same direction as the transmission direction of light that passes through the nonlinear medium 111, in other words, to be directed on a straight line.

Meanwhile, the intensity of the light made incident on the waveguide medium 110 other than the predetermined intensity is the intensity of light of the reference continuous pulse 151, the optical signal 152, and the strong light 153. In a state where light with an intensity other than the predetermined intensity is incident on the waveguide medium 110, the light changes the traveling direction to the direction of the optical path 131 in the boundary surface 113. In this manner, the intensity of light is changed based on the presence or absence of the optical signal 152 to allow the traveling direction of the light to be changed.

The optical signal 152 includes a "0" signal indicating OFF of the off state, a "1" signal indicating ON of the on state and the level 1, and a "2" signal indicating ON of the on state and the level 2 higher than the level 1. When the optical signal 152 at the level "1" or "2" is incident, light at either of the levels travels on the optical path 131 that is deflected from the optical path 130.

The angles of the optical path 131 to the optical path 130 when the optical signal 152 is "1" and "2" differ from each other. Specifically, for example, the higher the intensity of the optical signal 152 is, the more the optical path 131 is inclined to the y-axis direction side, in other words, the larger the angle deflected from the optical path 130 becomes. In the optical limiter 100, the strong light 153 is incident. This allows the large angle deflected from the optical path 130 even when the intensity of the optical signal 152 is weak, in other words, this allows the apparent nonlinear effect.

When the optical signal 152 is "0", in other words, when light of the reference continuous pulse 151 and the strong light 153 is incident on the waveguide medium 110, the incident light is outputted to the half mirror section 120. In other words, when light of the reference continuous pulse 151 and the strong light 153 is incident on the waveguide medium 110, the light indicating ON is outputted to the half mirror section 120.

In contrast, when light of the reference continuous pulse 151, the optical signal 152, and the strong light 153 is incident on the waveguide medium 110, the light is not outputted to the half mirror section 120 because the light does not travel straight ahead on the optical path 130 but travels on the optical path 131. In other words, in a state where light of the reference continuous pulse 151, the optical signal 152, and the strong light 153 is incident on the waveguide medium 110, light indicating OFF is outputted to the half mirror section 120. Further, the waveguide medium 110 and the half mirror section 120 are spaced by a distance to the extent that allows to determine whether light outputted from the waveguide medium 110 is deflected from the optical path 130.

In this manner, light indicating ON is outputted to the half mirror section 120 when no optical signal 152 is incident, and light indicating OFF is outputted to the half mirror section 120 when the optical signal 152 is incident independent of whether the optical signal 152 is "1" or "2". In other words, logic inverted light with respect to the presence or absence of the optical signal 152 is outputted to the half mirror section 120.

The detail of the half mirror section 120 is described later using FIG. 2. The half mirror section 120 is provided with, for example, two connection sections, and light outputted from the waveguide medium 110 is incident on one of the connection sections. Moreover, the reference continuous pulse 151 similar to the reference continuous pulse 151 that is incident on the waveguide medium 110 is incident on the other connection section.

The half mirror section 120 is one example of an inverse output section, is provided in an incident position of the reference continuous pulse 151 outputted from the nonlinear medium 111 when the optical signal 152 is off, and outputs an optical signal obtained by inversing the intensity of the incident light. The half mirror section 120 is capable of logic-inverting incident light and outputting the resultant optical signal at a reference level.

The strong light 153 included in light outputted from the waveguide medium 110 when the optical signal 152 is off is, for example, removed in a wavelength-dividing section (see FIG. 15), which is described later, and then the light is incident on the half mirror section 120. Further, a stage when the strong light 153 is removed is not limited before the light is incident on the half mirror section 120, but the strong light 153 may be removed after the light is outputted from the half mirror section 120.

Here, when the field intensity of the strong light 153 supplied from the outside is Eext and the intensity of the optical signal 152 is E, the refractive index N1 can be expressed by an expression (1) below.

$$N1 = N + dN \times (E + E\text{ext})^2 \qquad \text{expression (1)}$$

N is a constant for each nonlinear medium, and indicates a refractive index when the field intensity is 0. dN is a coefficient for each nonlinear medium. According to the above-mentioned expression (1), even if the nonlinear refractive index dN and the intensity E of the optical signal 152 are small, change in the refractive index by the electric field becomes $dN \times \{E^2 + 2 \times E \times E\text{ext} + E\text{ext}^2\}$. The term including E changes largely as illustrated in E×Eext with small change in E but large change in Eext. In this manner, while the optical signal 152 is not amplified, the strong light 153 is mixed from the outside to allow the refractive index N1 to be changed.

(Example of Half Mirror Section)

Figure 2:
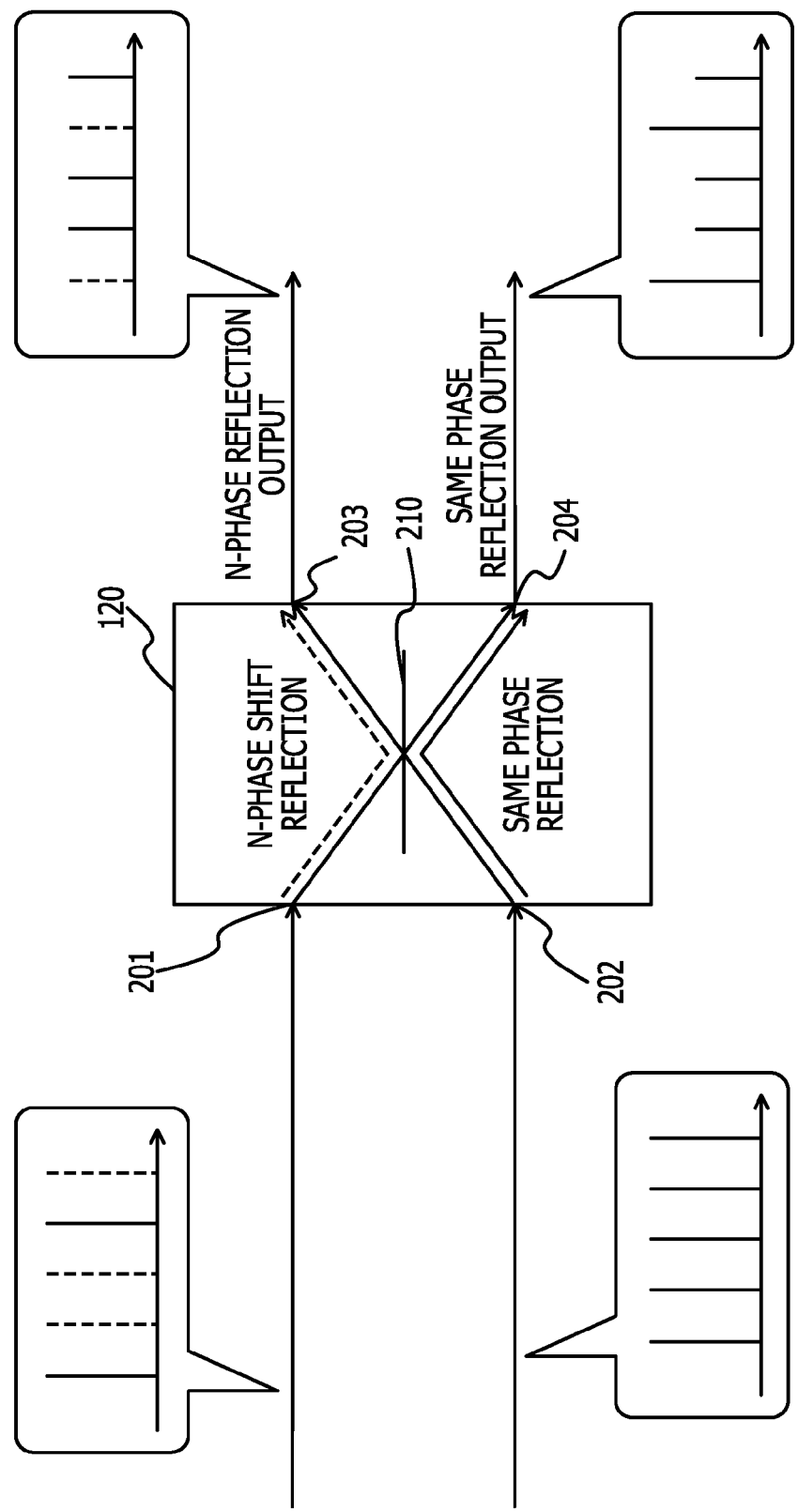
FIG. 2 is an explanation view illustrating one example of a half mirror section.

FIG. 2 is an explanation view illustrating one example of a half mirror section. As illustrated in FIG. 2, the half mirror section 120 includes connection sections 201, 202, 203, and 204, and a half mirror 210. Light outputted from the waveguide medium 110 (ON pulse or OFF pulse) is incident on the connection section 201. The reference continuous pulse 151 at a level twice the reference level similar to the reference continuous pulse 151 is incident on the waveguide medium 110 is incident on the connection section 202.

The half mirror 210 causes light incident from the connection section 201 and light incident from the connection section 202 to reflect thereof and pass therethrough and to output to the connection sections 203 and 204. Specifically, the half mirror 210 splits the light incident from the connection section 201 into reflection light (dashed line) in which a phase is shifted by a π radian and transmission light with the intensity similar to that of the reflection light in which a phase is not shifted. The half mirror 210 outputs the reflection light of the light incident from the connection section 201 to the connection section 203, and outputs the transmission light of the light incident from the connection section 201 to the connection section 204.

Moreover, the half mirror 210 splits the light incident from the connection section 202 into reflection light and transmission light with the approximately same intensity without shifting phases thereof. The half mirror 210 outputs the transmission light of the light incident from the connection section 202 to the connection section 203, and outputs the reflection light of the light incident from the connection section 202 to the connection section 204. Further, a metal thin film, for example, is used for the half mirror 210.

Moreover, the connection section 203 multiplexes the reflection light of the light incident on the connection section 201 and the transmission light of the light incident on the connection section 202, and outputs the multiplexed light. The connection section 204 multiplexes the transmission light of the light incident on the connection section 201 and the reflection light of the light incident on the connection section 202, and outputs the multiplexed light.

When ON pulses with the same wavelength are incident on both of the connection section 201 and the connection section 202, an OFF pulse is outputted from the connection section 203. When an ON pulse with a given wavelength is made incident on one of the connection section 201 and the connection section 202, and an OFF pulse with the same wavelength is made incident on the other thereof, an ON pulse with the approximately half intensity is outputted from the connection section 203.

Moreover, when OFF pulses with the same wavelength are incident on both of the connection section 201 and the connection section 202, an OFF pulse is outputted from the connection section 203. This enables the connection section 203 to output a logic inverted signal with the half intensity with respect to the pulse made incident on the connection section 201.

Moreover, when ON pulses with the same wavelength are made incident on both of the connection section 201 and the connection section 202, an ON pulse with the approximately same intensity is outputted from the connection section 204. Moreover, when an ON pulse with a given wavelength is made incident on one of the connection section 201 and the connection section 202, and an OFF pulse with the same wavelength is made incident on the other thereof, an ON pulse with the approximately half intensity is outputted from the connection section 204. Moreover, when OFF pulses with the same wavelength are incident on both of the connection section 201 and the connection section 202, an OFF pulse is outputted from the connection section 204. Further, in the optical limiter 100, the light outputted from the connection section 204 is not used but only the light outputted from the connection section 203 may be used.

(Example of Relation Between Incident Light Power and Output Light Power)

Figure 3:
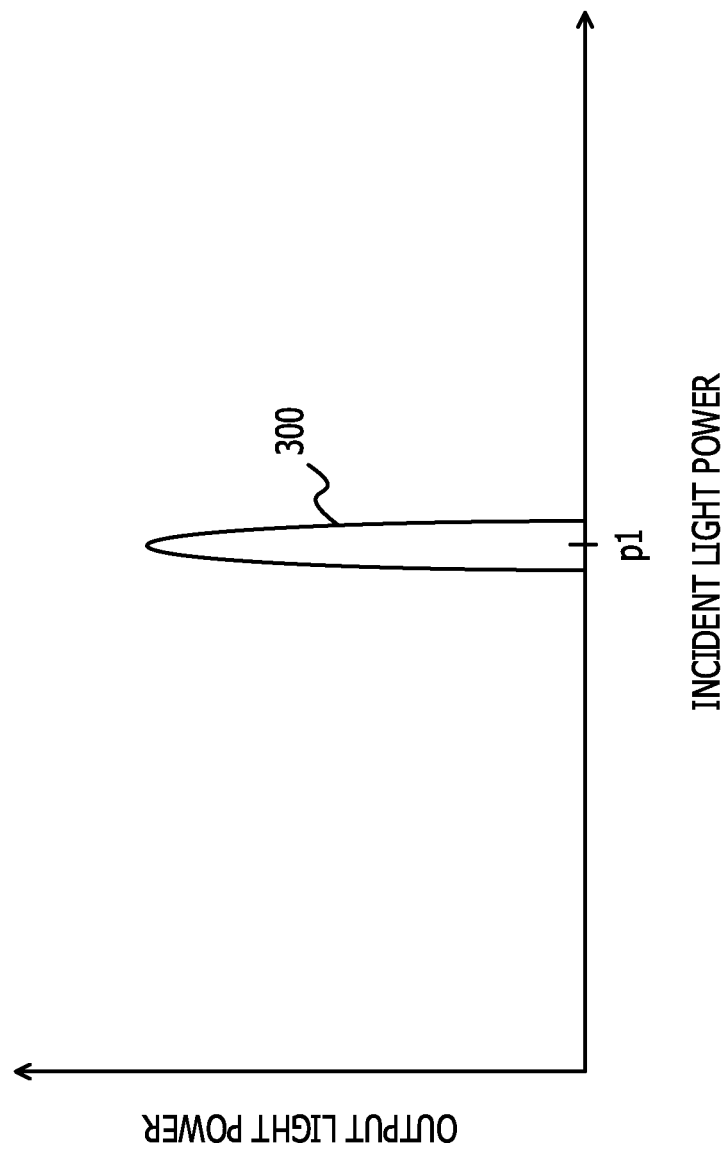
FIG. 3 is an explanation view illustrating one example of a relation between an incident light power and an output light power.

FIG. 3 is an explanation view illustrating one example of a relation between an incident light power and an output light power. In FIG. 3, the horizontal axis represents the incident light power, and the longitudinal axis represents the output light power. The incident light power is the intensity of light incident on the waveguide medium 110, and specifically is the intensity of light including the reference continuous pulse 151, the optical signal 152, and the strong light 153. The output light power is the intensity of light outputted from the waveguide medium 110.

As illustrated in a relation 300, at the vicinity of an incident light power p1, the output light power is high, and the output light power corresponding to the incident light power excluding the vicinity of the incident light power p1 is 0. Specifically, the relation 300 indicates that light passes at the vicinity of the incident light power p1. The incident light power becomes p1 when no optical signal 152 is incident but light of the reference continuous pulse 151 and the strong light 153 is incident. In other words, this indicates that in a state where light of the reference continuous pulse 151 and the strong light 153 is incident on the waveguide medium 110, the light is not reflected off the boundary surface 113 but passes through the nonlinear medium 111 and the linear medium 112, and travels straight ahead on the optical path 130.

In contrast, when the incident light power becomes the level excluding the incident light power p1, for example, light of the reference continuous pulse 151, the optical signal 152, and the strong light 153 is incident on the waveguide medium 110, the output light power becomes 0. In other words, this indicates that when incident light includes the optical signal 152, the refractive index in the nonlinear medium 111 changes to allow the traveling direction of the light to be changed in a direction toward the optical path 131. In this manner, the refractive index is changed in accordance with the intensity of light based on the presence or absence of the optical signal 152 to allow the light emission direction to be changed. In other words, the output light power can be changed in accordance with the intensity of light based on the presence or absence of the optical signal 152.

Further, the waveguide medium 110 may be configured such that the linear medium 112 is not used. Specifically, the waveguide medium 110 may be configured such that the linear medium 112 is evacuated, and only the nonlinear medium 111 is used. Note that, even in modification examples and other embodiments which are described hereinafter, the waveguide medium 110 may be configured such that the linear medium 112 is evacuated, and only the nonlinear medium 111 is used.

The optical limiter 100 can use the optical signal 152 of a non-uniform pulse in addition to the optical signal 152 of a uniform pulse. The non-uniform pulse means that the optical signal 152 is not a signal of "0", "1", or "2" but a signal of "0.7", for example. When the optical signal 152 of "0.7" is incident, the optical limiter 100 modulates the optical signal 152 to "1", for example.

In this manner, even when the optical signal 152 is a non-uniform pulse, the optical limiter 100 can generate inconsistencies in refractive indexes based on the presence or absence of a data pulse. This can obtain uniform pulse data in the straight ahead direction. In other words, the optical limiter 100 can perform a transfer in which the optical signal 152 of a different level is made to data of the reference level. This can obtain an effect of optical amplification similar to an optical transistor operation.

With the first embodiment, the strong light 153 is incident on the nonlinear medium 111 to allow the nonlinear effect to be produced in the nonlinear medium 111 with high efficiency even if the optical signal 152 has a weak intensity. This can obtain a limiter function without the optical signal 152 with a low intensity being strongly amplified in the front stage. Moreover, this also can obtain an optical signal with a desired intensity with high efficiency without making an optical path of the optical limiter long in order to obtain the nonlinear effect. Accordingly, upsizing of the apparatus can be suppressed.

(First Modification Example in First Embodiment)

Next, a first modification example in the first embodiment will be described. The first modification example in the first embodiment is different from the first embodiment in that the incident direction of the strong light 153 to the waveguide medium 110 differs from the incident direction of the reference continuous pulse 151 and the optical signal 152 to the waveguide medium 110. Note that, in the following explanation, as for a configuration similar to the configuration described above, the similar reference numerals are given and an explanation thereof is omitted. Also in other modification examples and other embodiments which are described hereinafter, similarly, as for a configuration similar to the configuration already described, the similar reference numerals are given, and an explanation thereof is omitted.

Figure 4:
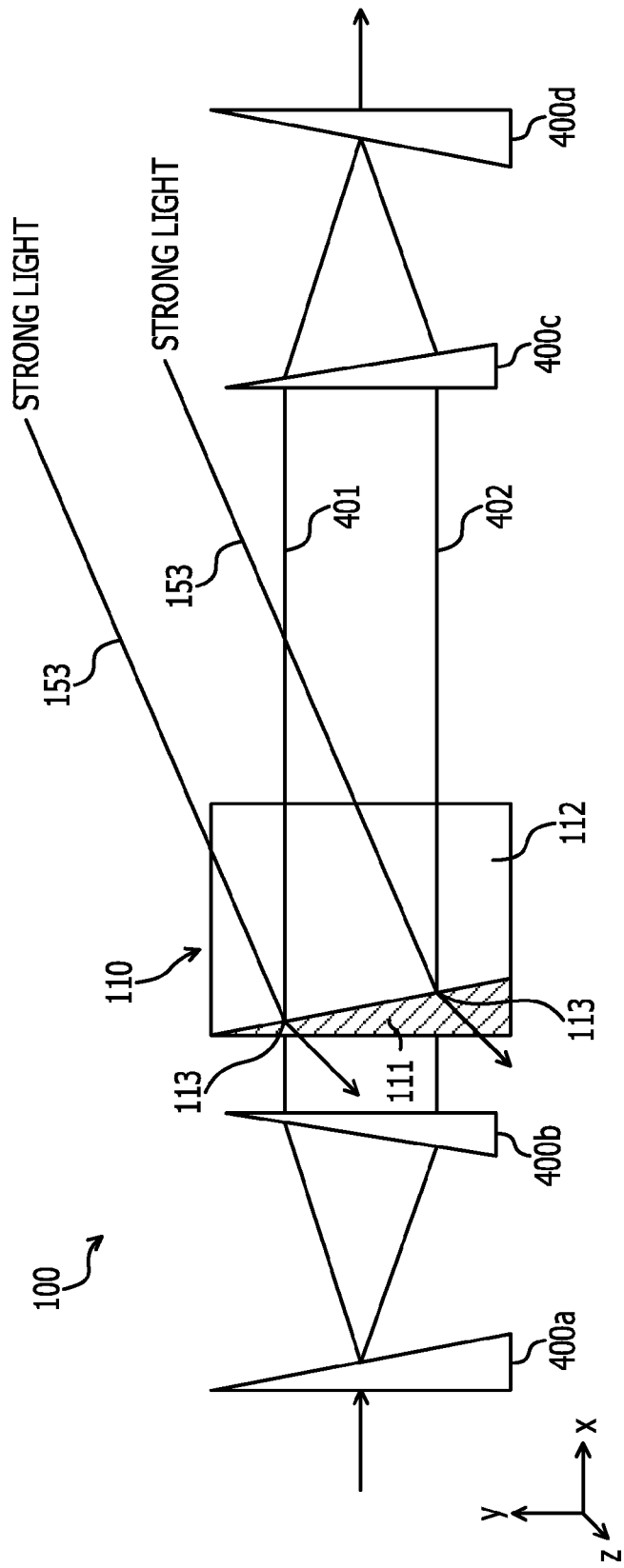
FIG. 4 is an explanation view illustrating a first modification example in the first embodiment.

FIG. 4 is an explanation view illustrating the first modification example in the first embodiment. As illustrated in FIG. 4, the optical limiter 100 includes the waveguide medium 110, multiple prisms 400a, 400b, 400c, and 400d. The reference continuous pulse 151 is constantly incident on the prism 400a, and the optical signal 152 is occasionally incident thereon. The prism 400a wavelength-divides the reference continuous pulse 151 and the optical signal 152 and outputs the resultant to the prism 400b.

Note that, for convenience of explanation, although an explanation is made on a case where the prism 400a divides light into two wavelengths of an optical path 401 and an optical path 402, the prism 400a actually divides light into a large number of continuous wavelengths. The prism 400b collimates (makes to be parallel) light outputted from the prism 400a, and outputs the light to the waveguide medium 110.

The waveguide medium 110 includes, for example, the nonlinear medium 111 of a triangular shape and the linear medium 112 of a trapezoidal shape. The reference continuous pulse 151 and the optical signal 152 from the prism 400b, and the strong light 153 from a direction different from that of the light from the prism 400b are incident on the waveguide medium 110. Both of the light including the reference continuous pulse 151 and the optical signal 152, and the strong light 153 are incident on the boundary surface 113, for example.

In this manner, the strong light 153 is incident from the direction different from the incident direction of the reference continuous pulse 151 and the optical signal 152. Moreover, the strong light 153 is incident on a portion through which wavelength-divided wavelength components of the reference continuous pulse 151 and the optical signal 152 pass.

Reflection light of the strong light 153 that is reflected off the boundary surface 113 is outputted to the outside without interfering with the reference continuous pulse 151 and the optical signal 152. In other words, the boundary surface 113 has an angle so as to release each reflection light to the outside. In this manner, the strong light 153 is incident on the waveguide medium 110 from the direction different from that of the reference continuous pulse 151 and the optical signal 152, and thus no mutual interference occurs. Accordingly, the wavelength of the strong light 153 may be the same wavelength or the same polarization direction as that of the reference continuous pulse 151 and the optical signal 152.

When incident light does not include the optical signal 152, the waveguide medium 110 outputs light of the reference continuous pulse 151 and the optical signal 152 to the prism 400c. In contrast, when incident light includes the optical signal 152, the waveguide medium 110 deflects the light traveling direction from the optical paths 401 and 402 by the nonlinear effect of the nonlinear medium 111, so that the light is not outputted to the prism 400c.

In the configuration in which the strong light 153 is incident from the direction different from the incident direction of the reference continuous pulse 151 and the optical signal 152, the strong light 153 is not outputted to a post stage but is outputted to the outside, so that the light outputted from the waveguide medium 110 does not include the strong light 153. This enables no wavelength-dividing section (see FIG. 15) that removes the strong light 153 to be provided. Note that, also in other modification examples and other embodiments which are described hereinafter, the configuration in which the strong light 153 is made incident from the direction different from that of the reference continuous pulse 151 allows no wavelength-dividing section (see FIG. 15) that removes the strong light 153 to be provided.

The prism 400c outputs light outputted from the waveguide medium 110 in the most post stage to the prism 400d by changing the light traveling direction. The prism 400d multiplexes light outputted from the prism 400c, and outputs the light to the half mirror section 120 in the post stage. The prism 400d is one example of a multiplex section, is provided at a position on which wavelength components of the reference continuous pulse 151 outputted from are incident when the optical signal 152 is off, multiplexes the incident light, and outputs the multiplexed light to the half mirror section 120.

In order that the strong light 153 does not interfere with the reference continuous pulse 151 and the optical signal 152 on the optical paths 401 and 402, such a configuration may be made that the strong light 153 is made incident from a direction other than an xy plane that is a plane including the optical paths 401 and 402. In other words, the optical limiter 100 may be configured such that the strong light 153 is made incident on the nonlinear medium 111 from a direction different from a direction on a plane (xy plane) including the optical paths 401 and 402 of wavelength components of the reference continuous pulse 151 outputted from the nonlinear medium 111.

Also in other modification examples and other embodiments which are described hereinafter, in the configuration in which the strong light 153 is made incident from a direction different from that of the optical signal 152, the direction from which the strong light 153 is made incident may be a direction other than the xy plane including the optical paths 401 and 402.

Moreover, in order that reflection light reflected by the nonlinear effect does not interfere with light on the optical paths 401 and 402, such a configuration may be made that the boundary surface 113 of the waveguide medium 110 causes light to be reflected in a direction other than the xy plane including the optical paths 401 and 402. In other words, the optical limiter 100 may be configured such that the optical signal 152 is outputted to a direction different from a direction on a plane (xy plane) including the optical paths 401 and 402 of wavelength components of the reference continuous pulse 151 outputted from the nonlinear medium 111.

For this configuration, the waveguide medium 110 illustrated in FIG. 4 may be rotated about the x-axis direction as a rotation axis, for example. Also in other modification examples and other embodiments which are described hereinafter, reflection light reflected by the nonlinear effect may be reflected in a direction other than the xy plane including the optical paths 401 and 402.

With the first modification example in the first embodiment, similar to the first embodiment, a limiter function can be obtained without the optical signal 152 with a low intensity being strongly amplified in the front stage. Moreover, the reference continuous pulse 151 and the optical signal 152 are wavelength-divided, and thereafter the strong light 153 is made incident. This can obtain the nonlinear effect for each wavelength, and can suppress a crosstalk. Moreover, the optical limiter 100 outputs the strong light 153 to the outside instead of outputting the strong light 153 to the post stage. This can produces an effect of making it unnecessary to remove the strong light 153.

(Second Modification Example in First Embodiment)

Next, a second modification example in the first embodiment will be described. The second modification example in the first embodiment is different from the first embodiment in such a configuration (multiple-stage configuration) that multiple waveguide media 110 are disposed in series.

Figure 5:
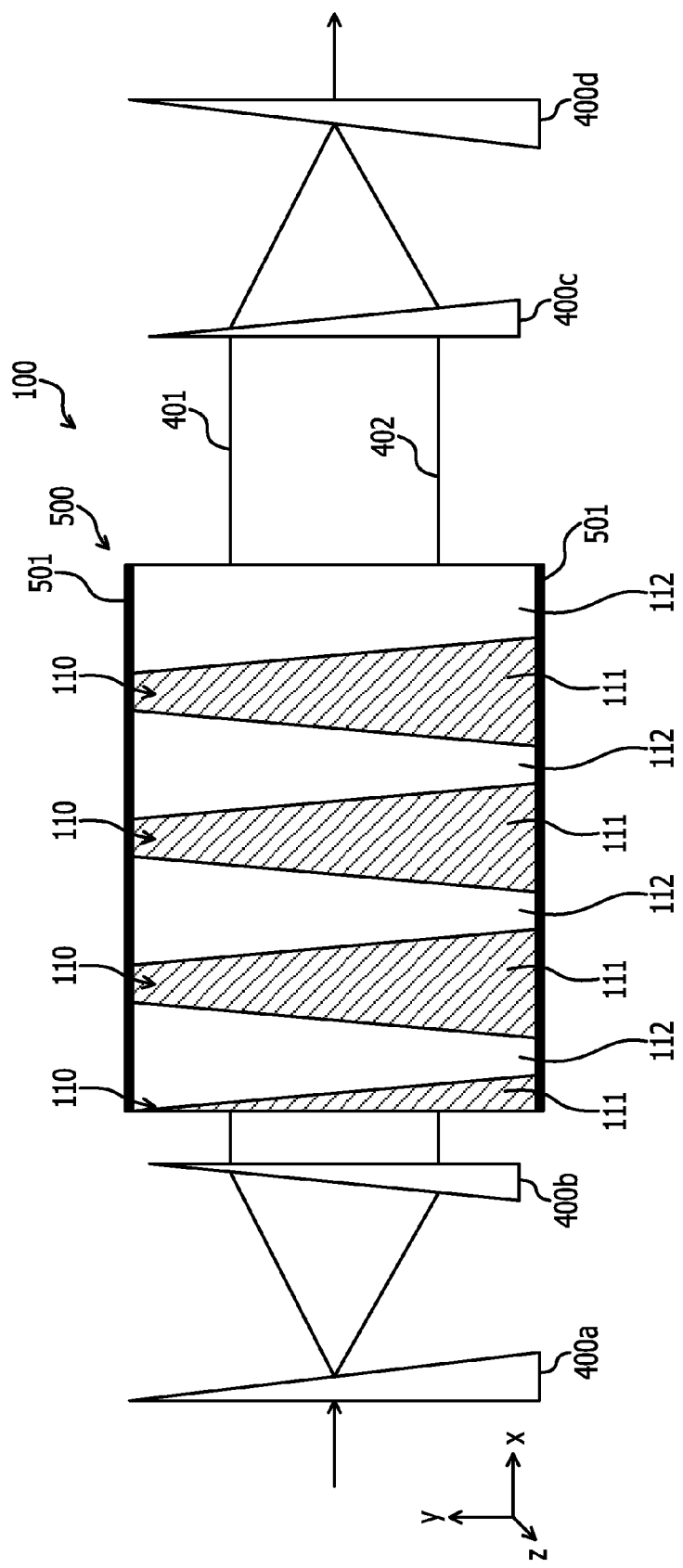
FIG. 5 is an explanation view illustrating a second modification example in the first embodiment.

FIG. 5 is an explanation view illustrating the second modification example in the first embodiment. As illustrated in FIG. 5, the reference continuous pulse 151 and the strong light 153 are constantly incident on the prism 400a, and in addition to the reference continuous pulse 151 and the strong light 153, the optical signal 152 is occasionally incident thereon. The prism 400b collimates light outputted from the prism 400a by changing the light traveling direction, and outputs the collimated light to a waveguide media group 500.

the waveguide media group 500 is one example of a media group, and multiple waveguide media 110 are disposed in series in the light traveling direction (x-axis direction). Specifically, the waveguide media group 500 is a media group in which multiple pairs each including the nonlinear medium 111 and the linear medium 112 having a nonlinear effect smaller than that of the nonlinear medium 111 are disposed in series with respect to the traveling direction of the reference continuous pulse 151 and the optical signal 152.

The nonlinear medium 111 of the waveguide medium 110 has, for example, a trapezoidal shape or a triangular shape. Moreover, the linear medium 112 has, for example, a trapezoidal shape. The waveguide media group 500 is provided with nonreflective coating parts 501. The nonreflective coating part 501 is one example of a reflection restriction section, is provided at a position on which the optical signal 152 outputted from the nonlinear medium 111 is incident at the lighting of the optical signal 152, and has a function to suppress reflection of the incident light.

Specifically, the nonreflective coating part 501 causes the light including the reference continuous pulse 151, the optical signal 152, and the strong light 153 that is incident on the waveguide media group 500 and is deflected from the optical paths 401 and 402 by the nonlinear effect not to be reflected and entered into the optical paths 401 and 402. This allows the reflection light not to interfere with the light on the optical paths 401 and 402.

When incident light does not include the optical signal 152, the waveguide media group 500 outputs the light to the prism 400c. When incident light includes the optical signal 152, the waveguide media group 500 deflects the light traveling direction from the optical paths 401 and 402 by the nonlinear effect of the nonlinear medium 111 and outputs the light in a direction of nonreflective coating parts 501, so that the light is not outputted to the prism 400c.

The prism 400c outputs light outputted from the waveguide media group 500 to the prism 400d by changing the light traveling direction. The prism 400d multiplexes light outputted from the prism 400c, and outputs the multiplexed light in the post stage. In the post stage of the prism 400d, at a position on which the reference continuous pulse 151 outputted from the waveguide media group 500 is incident, provided are the wavelength-dividing section (see FIG. 15) that removes the strong light 153, and the half mirror section 120.

In the second modification example in the first embodiment, a limiter function can be obtained without the optical signal 152 with a low intensity being strongly amplified in the front stage. Moreover, the waveguide medium 110 is configured in multiple stages, so that the multiple-stage configuration allows a traveling path to be largely deflected from the optical paths 401 and 402 even if the traveling path can be deflected from the optical paths 401 and 402 by the nonlinear effect in one waveguide medium 110. In other words, the further apparent nonlinear effect can be obtained. Moreover, the reference continuous pulse 151 and the optical signal 152 are wavelength-divided, and thereafter the strong light 153 is made incident. This can obtain the nonlinear effect for each wavelength, and can suppress a crosstalk.

Moreover, the nonreflective coating parts 501 can suppress the signal quality caused by light that is deflected from the optical paths 401 and 402 by the nonlinear effect, and interferers with other light by reflection from being deteriorated.

(Third Modification Example in First Embodiment)

Next, a third modification example in the first embodiment will be described. The third modification example in the first embodiment is different from the above-described second modification example in the shape the waveguide media 110 included in the waveguide media group 500.

Figure 6:
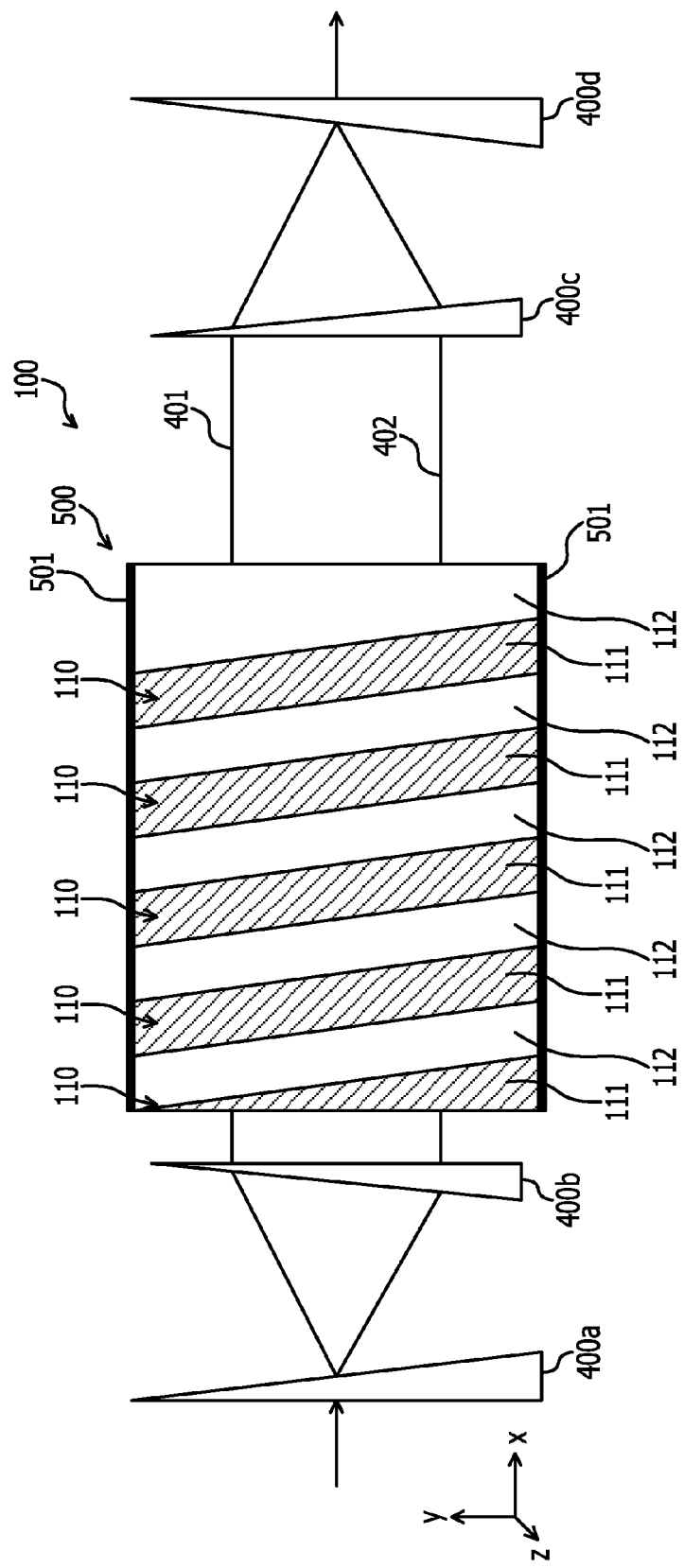
FIG. 6 is an explanation view illustrating a third modification example in the first embodiment.

FIG. 6 is an explanation view illustrating the third modification example in the first embodiment. As illustrated in FIG. 6, the waveguide media group 500 includes multiple waveguide media 110 disposed in series in the x-axis direction. the nonlinear medium 111 of the waveguide medium 110 has a parallel quadrilateral shape or a triangular shape, for example. The linear medium 112 has a parallel quadrilateral shape or a trapezoidal shape, for example. In a configuration of the third modification example in the first embodiment, the number of the waveguide media 110 is more compared with that in the configuration of the above-described second modification example, and the direction in which the light is deflected from the optical paths 401 and 402 by the nonlinear effect is different from that in the second modification example.

With such a configuration, similar to the above-described second modification example, the multiple-stage configuration allows a traveling path to be largely deflected from the optical paths 401 and 402, whereby the further apparent nonlinear effect can be obtained. Accordingly, a limiter function can be obtained without the optical signal 152 with a low intensity being strongly amplified in the front stage.

(Fourth Modification Example in First Embodiment)

Next, a fourth modification example in the first embodiment will be described. The fourth modification example in the first embodiment is different from the above-described second and third modification examples in the shape of the waveguide media 110 included in the waveguide media group 500.

Figure 7:
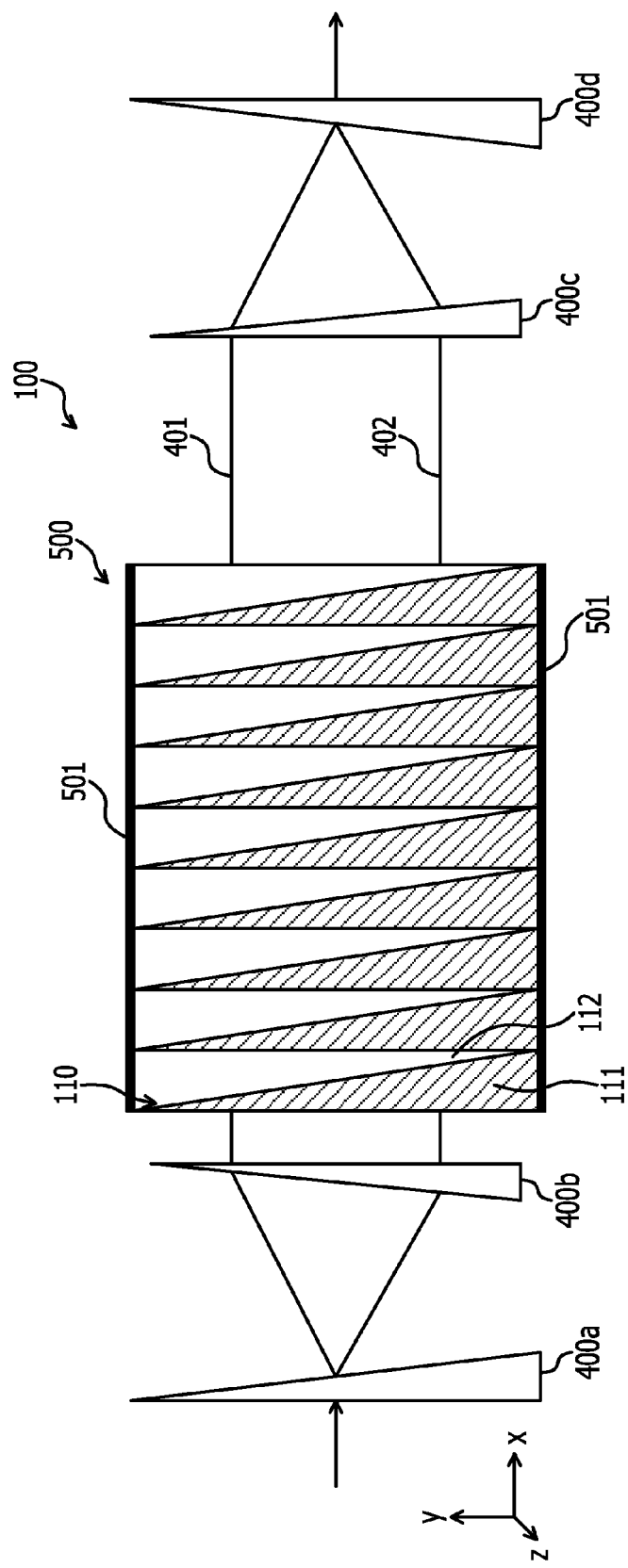
FIG. 7 is an explanation view illustrating a fourth modification example in the first embodiment.

FIG. 7 is an explanation view illustrating the fourth modification example in the first embodiment. As illustrated in FIG. 7, the waveguide media group 500 includes multiple waveguide media 110 disposed in series in the x-axis direction. The nonlinear medium 111 and the linear medium 112 of the waveguide medium 110 are formed in triangular shapes, for example. In a configuration of the fourth modification example, the number of the waveguide media 110 is more compared with that in the configurations of the above-described second and third modification examples, and the direction in which the light is deflected from the optical paths 401 and 402 by the nonlinear effect is different from that in the second and third modification examples.

With such a configuration, similar to the above-described second and third modification examples, the multiple-stage configuration allows a traveling path to be largely deflected from the optical paths 401 and 402, whereby the further apparent nonlinear effect can be obtained. Accordingly, a limiter function can be obtained without the optical signal 152 with a low intensity being strongly amplified in the front stage.

(Fifth Modification Example in First Embodiment)

Next, a fifth modification example in the first embodiment will be described. The fifth modification example in the first embodiment is different from the above-described second to fourth modification examples in the shape of the waveguide media 110 included in the waveguide media group 500.

Figure 8:
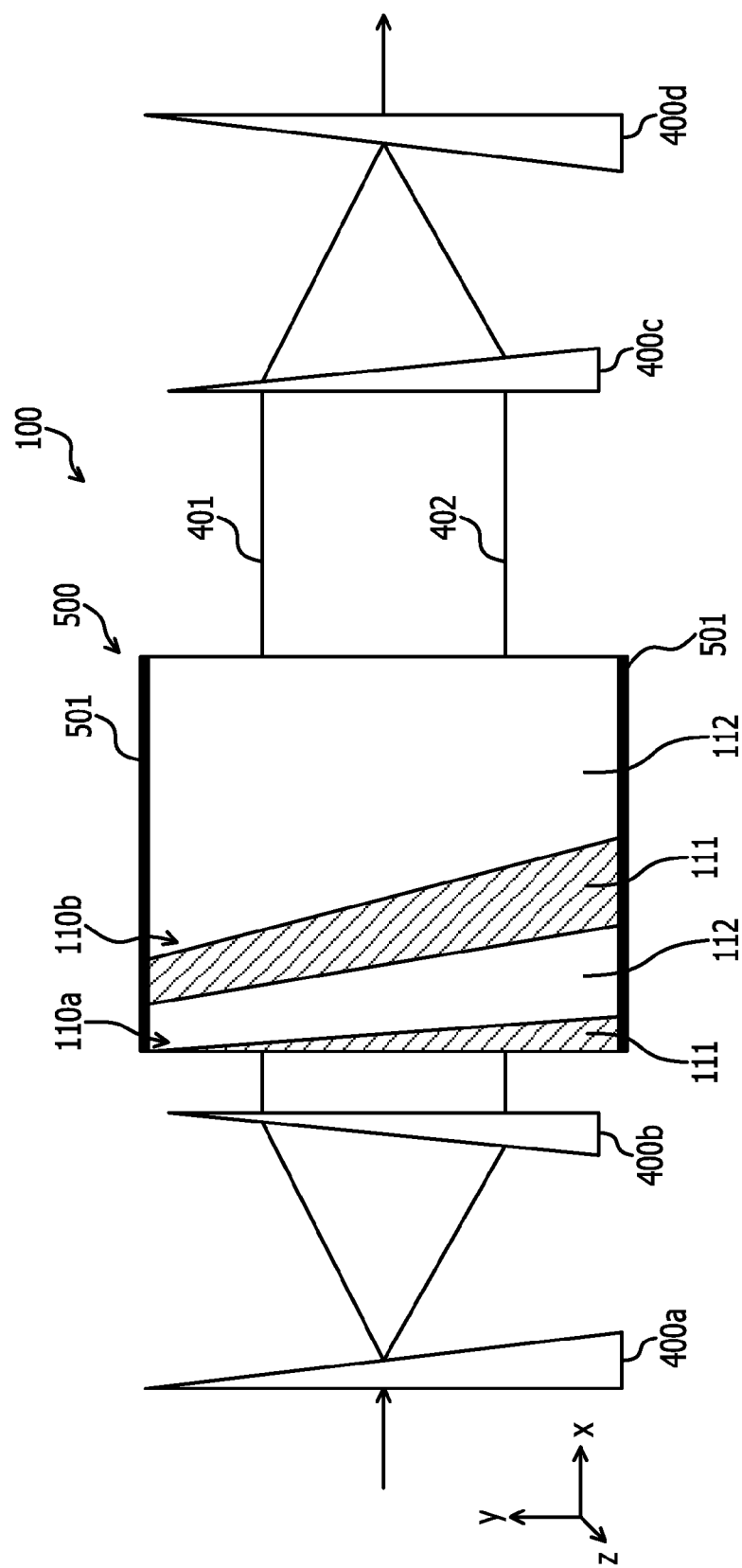
FIG. 8 is an explanation view illustrating a fifth modification example in the first embodiment.

FIG. 8 is an explanation view illustrating the fifth modification example in the first embodiment. As illustrated in FIG. 8, the waveguide media group 500 includes multiple waveguide media 110a and 110b disposed in series in the x-axis direction. The multiple waveguide media 110a and 110b have different shapes. In the waveguide media 110a and 110b, the nonlinear media 111 and the linear media 112 have different shapes.

In the configuration in the fifth modification example in the first embodiment, the direction in which the light is deflected from the optical paths 401 and 402 by the nonlinear effect can be made large stepwise, in other words, the second stage can be made larger than the first stage. With such a configuration, similar to the above-described second to fourth modification examples, the further apparent nonlinear effect can be obtained. Moreover, the light can be deflected from the optical paths 401 and 402 with the reduced number of stages, whereby the further apparent nonlinear effect can be obtained. Accordingly, a limiter function can be obtained without the optical signal 152 with a low intensity being strongly amplified in the front stage.

(Sixth Modification Example in First Embodiment)

Next, a sixth modification example in the first embodiment will be described. The sixth modification example in the first embodiment is different from the first embodiment in such a configuration that multiple waveguide media 110 are disposed in series, and that the incident direction of the strong light 153 to the waveguide medium 110 differs from the incident direction of the reference continuous pulse 151 and the optical signal 152 to the waveguide medium 110.

Figure 9:
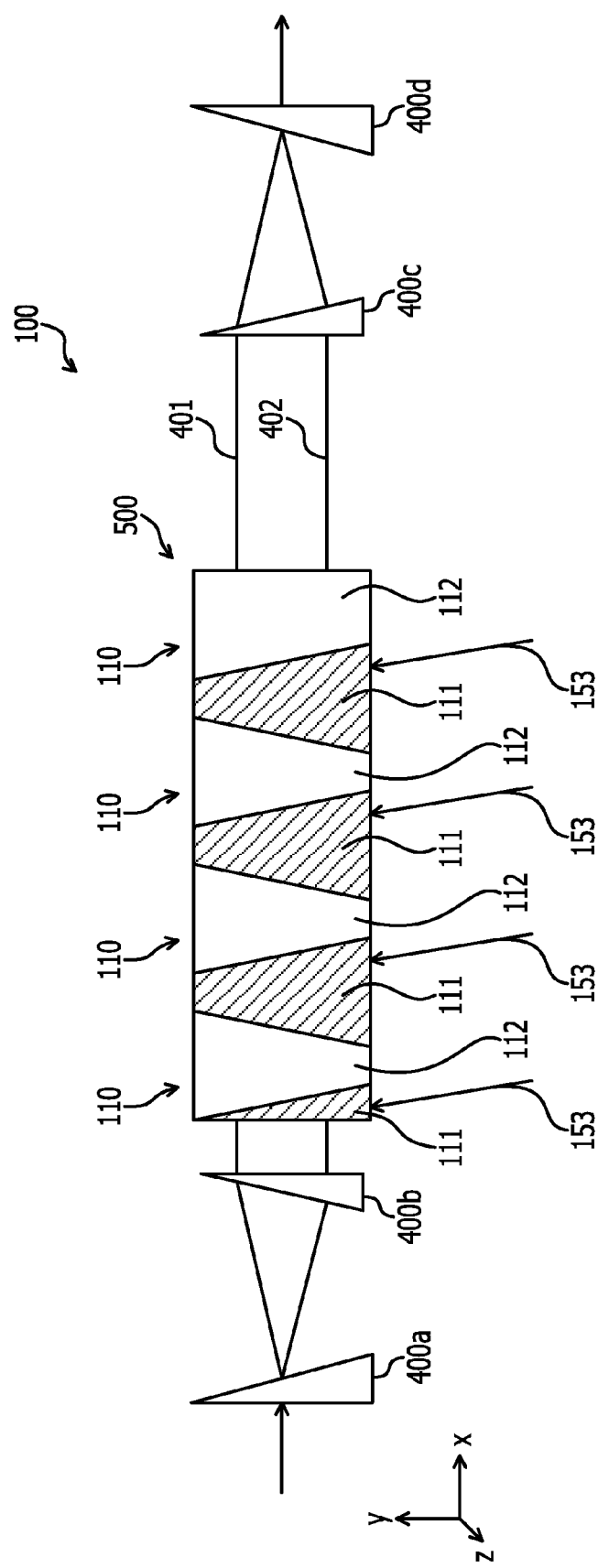
FIG. 9 is an explanation view illustrating a sixth modification example in the first embodiment.

FIG. 9 is an explanation view illustrating a sixth modification example in the first embodiment. As illustrated in FIG. 9, the reference continuous pulse 151 is constantly incident on the prism 400a, and the optical signal 152 is occasionally incident thereon.

The waveguide media group 500 includes multiple waveguide media 110 disposed in series in the x-axis direction. The nonlinear medium 111 of the waveguide medium 110 has a trapezoidal shape or a triangular shape, for example. The linear medium 112 is formed in a trapezoidal shape, for example. The waveguide media group 500 has no nonreflective coating parts 501 (see FIG. 5) as in the above-described second modification example. In each waveguide medium 110 out of the waveguide media group 500, the strong light 153 is made incident on wavelength components of the reference continuous pulse 151 and the optical signal 152 from a direction different from that of the reference continuous pulse 151 and the optical signal 152.

Reflection light of the strong light 153 incident on the waveguide medium 110 is outputted to the outside without interfering with the reference continuous pulse 151 and the optical signal 152. The strong light 153 is incident on the waveguide medium 110 from the direction different from that of the reference continuous pulse 151 and the optical signal 152, and thus no mutual interference occurs. Accordingly, the wavelength of the strong light 153 may be the same wavelength as that of the reference continuous pulse 151 and the optical signal 152.

When incident light does not include the optical signal 152, the waveguide media group 500 outputs the light to the prism 400c. Meanwhile, when incident light includes the optical signal 152, the waveguide media group 500 deflects the traveling direction of light including the reference continuous pulse 151 and the optical signal 152 from the optical paths 401 and 402 by the nonlinear effect of the nonlinear medium 111, so that the light is not outputted to the prism 400c.

Moreover, in the configuration in which the strong light 153 is incident from the direction different from the incident direction of the reference continuous pulse 151 and the optical signal 152, the strong light 153 is outputted to the outside, so that the light outputted from the waveguide medium 110 does not include the strong light 153. Accordingly, this enables no wavelength-dividing section (see FIG. 15) that removes the strong light 153 to be provided.

With the sixth modification example in the first embodiment, the multiple-stage configuration allows a traveling path to be largely deflected from the optical paths 401 and 402, whereby the further apparent nonlinear effect can be obtained. Accordingly, a limiter function can be obtained without the optical signal 152 with a low intensity being strongly amplified in the front stage. Moreover, the strong light 153 is not outputted to the post stage but is outputted to the outside. This can obtain an effect that the strong light 153 may not be removed.

(Second Embodiment)

Next, a second embodiment will be described. The second embodiment is different from the first embodiment in that the optical paths 401 and 402 of light that is incident on the waveguide medium 110 and the boundary surface 113 of the waveguide medium 110 are configured so as to be vertical to each other. In the second embodiment, a fact that the transmittance in a nonlinear medium differs in accordance with the intensity of light is used, and a configuration thereof is different from the configuration in the first embodiment in which a logic inverted signal is outputted in accordance with the presence or absence of the optical signal 152. Accordingly, the second embodiment is configured such that neither the reference continuous pulse 151 nor the half mirror section 120 are used.

(Configuration Example of Optical Limiter)

Figure 10:
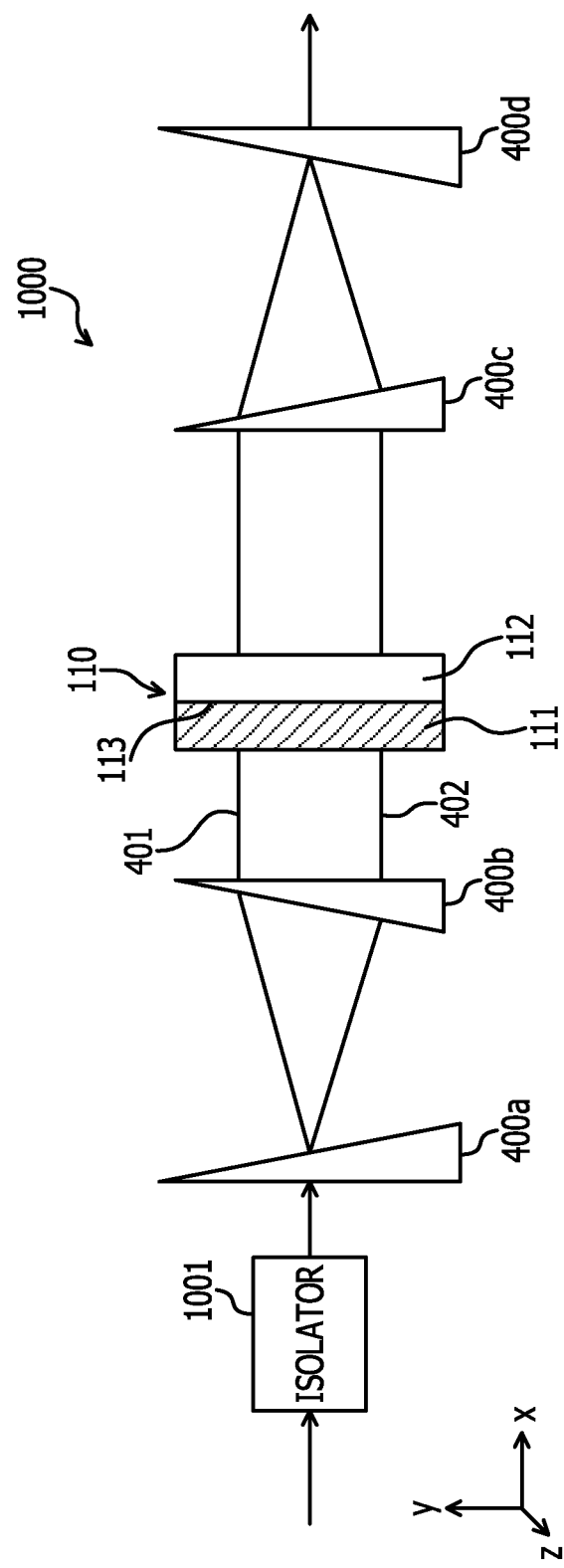
FIG. 10 is an explanation view illustrating one example of an optical limiter according to a second embodiment.

FIG. 10 is an explanation view illustrating one example of an optical limiter according to the second embodiment. In FIG. 10, an optical limiter 1000 includes an isolator 1001, the multiple prisms 400a, 400b, 400c, and 400d, and the waveguide medium 110. The isolator 1001 has a function to insulate between a signal incident on the isolator 1001 and a signal outputted from the isolator 1001.

Light including the optical signal 152 and the strong light 153 is incident on the isolator 1001. The isolator 1001 outputs the incident light to the prism 400a. The light outputted from the isolator 1001 is removed by the isolator 1001 without being again incident on the isolator 1001 even if the light is reflected off the prism 400a, the waveguide medium 110, or the like.

Light outputted from the isolator 1001 and including the optical signal 152 and the strong light 153 is incident on the prism 400a. The prism 400a wavelength-divides each of the optical signal 152 and the strong light 153 and makes the resultant light incident on the prism 400b. The collimated light from the prism 400b is incident on the waveguide medium 110.

The waveguide medium 110 includes the nonlinear medium 111, the linear medium 112, and the boundary surface 113. The refractive index of the nonlinear medium 111 changes in accordance with the intensity of incident light, and passes the incident light with different transmittance depending on the refractive index therethrough. The nonlinear medium 111 has a characteristic that while the incident light has a low intensity in a first range (for example, range where the incident light power is less than p2 in FIG. 11), the transmittance in a second range (for example, range where the incident light power is p2 or more in FIG. 11) in which the intensity of light is higher than that in the first range is smaller than the transmittance in the first range. The optical limiter 1000 has a function as a first incident section that makes the optical signal 152 with the modulated intensity incident on the nonlinear medium 111.

The linear medium 112 has a smaller nonlinear effect compared with the nonlinear medium 111, is disposed in series with the nonlinear medium 111 with respect to the traveling direction of the optical signal 152, and passes the light incident from the nonlinear medium 111 therethrough.

The boundary surface 113 is provided to be vertical to the optical paths 401 and 402 of light to be incident. The waveguide medium 110 does not change a direction in which light travels depending on the intensity of light, and causes the light to travel straight ahead. The strong light 153 is light with an intensity in which the variation range of the total with the intensity of the optical signal 152 falls in a range (for example, variation range that extends over incident light power p2 in FIG. 11) including at least a part of the first range of low intensity and a part of the second range of high intensity.

Moreover, the wavelength or the polarization direction of the strong light 153 is different from that of the optical signal 152. This enables the strong light 153 to be incident from the same direction as the incident direction of the optical signal 152. Moreover, the strong light 153 is incident on a portion through which wavelength-divided wavelength components of the optical signal 152 pass. The optical limiter 1000 has a function as a second incident section that makes the strong light 153 incident on a portion out of the nonlinear medium 111 through which the optical signal 152 passes.

In the optical limiter 1000 according to the second embodiment, when light with a low intensity in the first range is incident on the waveguide medium 110, the intensity of the light is attenuated by reflection in the nonlinear medium 111. In contrast, when light with a high intensity or more is incident on the waveguide medium 110, attenuation of the intensity of the light by the reflection in the nonlinear medium 111 is stopped, and the incident light passes through the nonlinear medium 111 and the linear medium 112.

For example, the optical limiter 1000 is configured to set the transmittance to ½ with the power of light to be incident on the waveguide medium 110 being "2", and causes the light to be passed without any change with the power being "1". Note that, a relation between the incident light power and the output light power will be described later using FIG. 11. The light that passes through the linear medium 112 is outputted to the prism 400c.

The prism 400c outputs light outputted from the waveguide medium 110 to the prism 400d by changing the light traveling direction. The prism 400d multiplexes light outputted from the prism 400c, and outputs the light in the post stage. Moreover, the strong light 153 included in the light to be outputted is removed in the wavelength-dividing section (see FIG. 15), which is described later. The prism 400d is one example a multiplex section, is provided at a position on which wavelength components of light outputted from the waveguide medium 110 are incident, multiplexes the incident light, and outputs the light in the post stage.

(One Example of Relation between Incident Light Power and Output Light Power)

Figure 11:
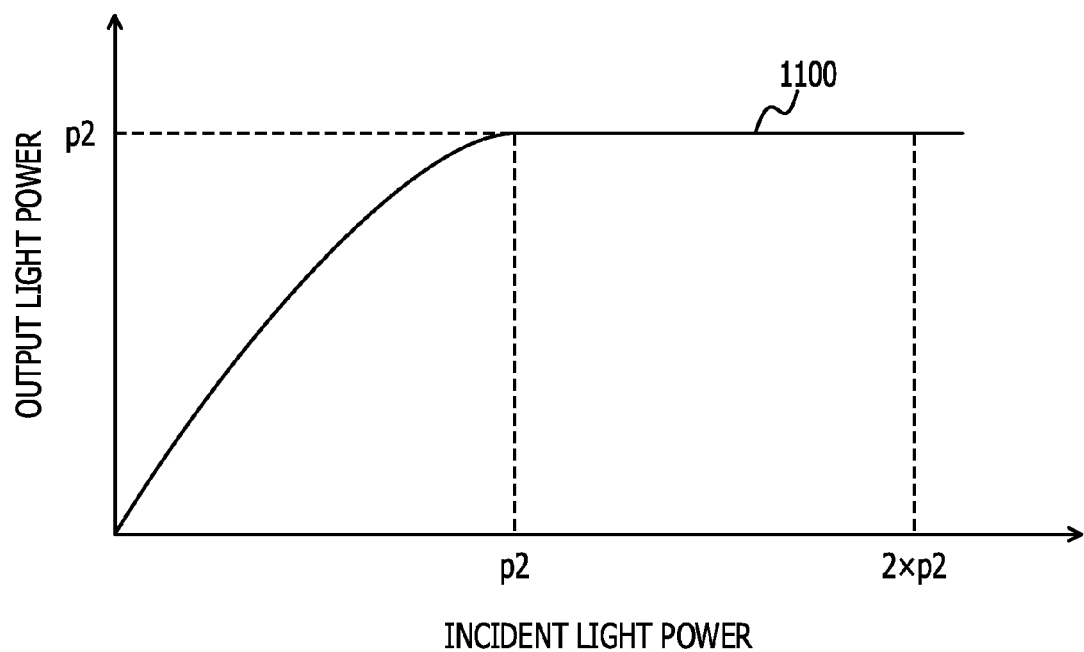
FIG. 11 is an explanation view illustrating one example of a relation between an incident light power and an output light power.

FIG. 11 is an explanation view illustrating one example of a relation between an incident light power and an output light power. In FIG. 11, the horizontal axis represents incident light power, and the longitudinal axis represents output light power. The incident light power is the intensity of light incident on the waveguide medium 110, specifically, the intensity of light of the optical signal 152 and the strong light 153. The output light power is the intensity of light outputted from the waveguide medium 110.

As illustrated in a relation 1100, when the incident light power is less than p2 that is in the first range, power of light to be passed increases as the incident power increases. When the incident light power becomes p2 that is the minimum value in the second range, the output light power is also saturated at about p2, so that the output light power does not rise to p2 or more even when the incident light power becomes p2 or more. Moreover, when light having an incident light power twice the incident light power p2 is incident, the waveguide medium 110 outputs light of p2 which has the intensity of the incident light reduced by half. In this manner, the output light power of light having an incident light power of p2 or more can be limited to p2 by the waveguide medium 110.

In order to satisfy such the relation 1100, for example, the medium length of the waveguide medium 110 also may preferably satisfy a certain condition. Here, a relation between the medium length of the waveguide medium 110 and the output light power will be described.

(One Example of Relation Between Medium Length and Output Light Power)

Figure 12:
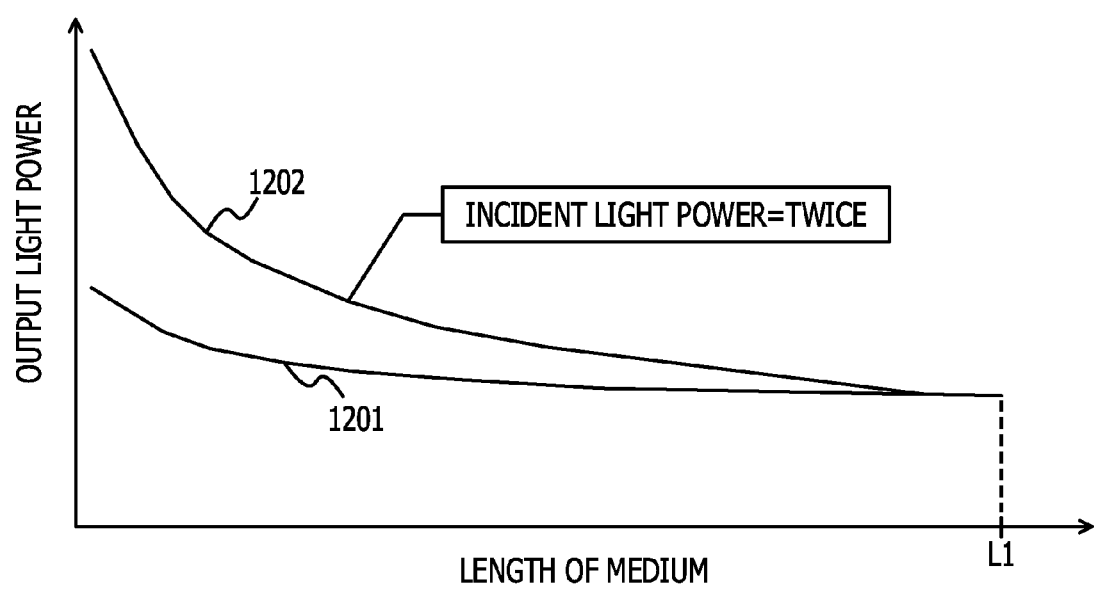
FIG. 12 is an explanation view illustrating one example of a relation between the length of a medium and the output light power.

FIG. 12 is an explanation view illustrating one example of a relation between the length of a medium and the output light power. In FIG. 12, the horizontal axis represents the length of a medium, and the longitudinal axis represents the output light power. The medium length is the length of the waveguide medium 110, for example. The output light power is the intensity of light outputted from the waveguide medium 110.

A relation 1201 indicates a relation between the medium length and the output light power when light having a certain power (for example, p3) is incident on the waveguide medium 110. A relation 1202 indicates a relation between the medium length and the output light power when an incident signal having a power (2×p3) twice the relation 1201 is incident on the waveguide medium 110. As illustrated in the relations 1201 and 1202, when the medium length of the waveguide medium 110 is less than L1, the output light power decreases by reflection.

In contrast, when the medium length of the waveguide medium 110 is L1 or more, the output light power is saturated and the output light power does not decrease. In this manner, there is a relationship between the medium length of the waveguide medium 110 and the output light power. Accordingly, the optical limiter 1000 uses the waveguide medium 110 having a length to the extent that the output light power is saturated.

With the second embodiment, the optical signal 152 and the strong light 153 are incident on the nonlinear medium 111 to allow the nonlinear effect in the nonlinear medium 111 to be produced even if the intensity of light including the optical signal 152 is weak. This can obtain a limiter function without the optical signal 152 being strongly amplified in the front stage. Moreover, the optical signal 152 is wavelength-divided, and thereafter the strong light 153 is made incident. This can obtain the nonlinear effect for each wavelength, and can suppress a crosstalk.

(First Modification Example in Second Embodiment)

Next, a first modification example in the second embodiment will be described. The first modification example in the second embodiment is different from the second embodiment in such a configuration that the waveguide media 110 are disposed in series (for example, two stages).

Figure 13:
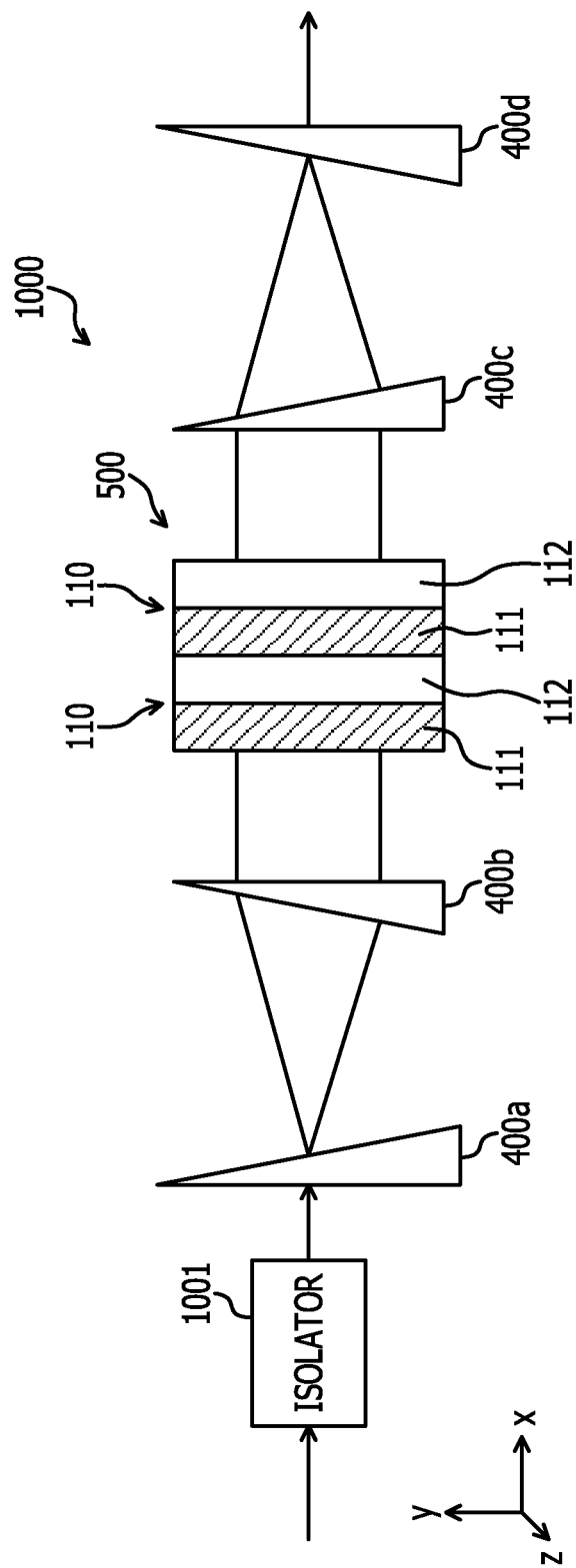
FIG. 13 is an explanation view illustrating a first modification example in the second embodiment.

FIG. 13 is an explanation view illustrating the first modification example in the second embodiment. As illustrated in FIG. 13, the waveguide medium 110 is a pair of the nonlinear medium 111, and the linear medium 112 that has an unchangeable refractive index independent of the intensity of incident light and causes light outputted from the nonlinear medium 111 to pass therethrough.

The waveguide media group 500 is configured such that the multiple waveguide media 110 are disposed in series in the x-axis direction. The multiple waveguide media 110 in the waveguide media group 500 are set in such a manner that when light having power at a predetermined level or more is incident on the waveguide media 110, the refractive indexes of the waveguide media 110 become equal, so that the transmittance becomes 100%. The strong light 153 is incident on the nonlinear media 111 in the waveguide media group 500. In the optical limiter 1000, the rate of reflection per one surface is sufficiently reduced to allow the influence by the reflection light to be reduced.

With the configuration of the first modification example in the second embodiment, a limiter function can be obtained without the optical signal 152 with a low intensity being strongly amplified in the front stage. Moreover, the waveguide medium 110 includes multiple stages, so that the multiple-stage configuration allows a traveling path to be largely deflected from the optical paths 401 and 402 even if the traveling path can be deflected from the optical paths 401 and 402 by the nonlinear effect in one waveguide medium 110. In other words, the further apparent nonlinear effect can be produced.

(Second Modification Example in Second Embodiment)

Next, a second modification example in the second embodiment will be described. The second modification example in the second embodiment is different from the first modification example in the second embodiment in that the incident direction of the strong light 153 to the waveguide medium 110 differs from the incident direction of the optical signal 152 to the waveguide medium 110.

Figure 14:
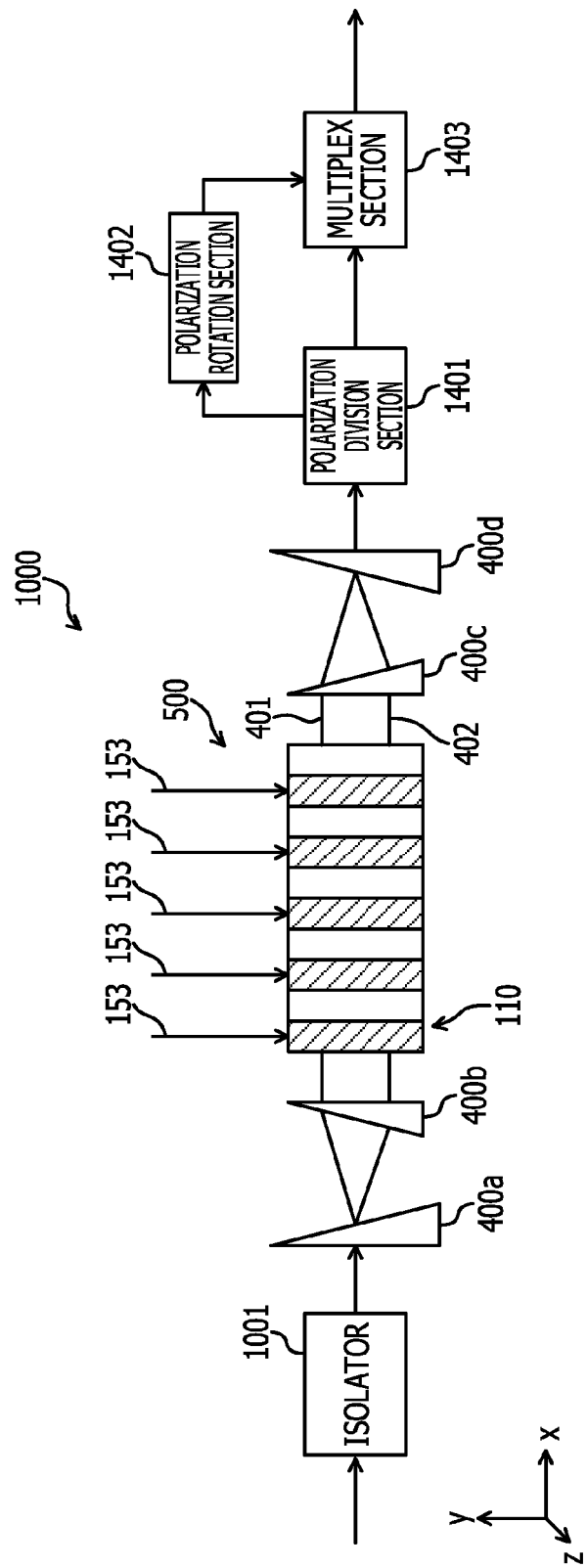
FIG. 14 is an explanation view illustrating a second modification example in the second embodiment.

FIG. 14 is an explanation view illustrating the second modification example in the second embodiment. As illustrated in FIG. 14, the optical limiter 1000 includes the waveguide media group 500, the isolator 1001, the multiple prisms 400a, 400b, 400c, and 400d, a polarization division section 1401, a polarization rotation section 1402, and a multiplex section 1403.

Light including the optical signal 152 is incident on the isolator 1001. The light has an electric field amplitude in the z-axis direction, for example. The isolator 1001 outputs the incident light to the prism 400a. The light outputted from the isolator 1001 is incident on the prism 400a.

The optical signal 152 and the strong light 153 are incident on the waveguide media 110 in the waveguide media group 500. The strong light 153 is a strong continuous pulse (or CW light), for example, with the electric field amplitude in the z-axis direction and the arranged polarization surfaces, and commonly acts on signals of all wavelengths. The strong light 153 is incident on the nonlinear medium 111 from a direction different from the incident direction of the optical signal 152. Reflection light of the strong light 153 is outputted to the outside without interfering with the optical signal 152. Moreover, the strong light 153 is incident from a direction different from the direction on the xy plane including the optical paths 401 and 402 of wavelength components of light outputted from the nonlinear medium 111.

Here, the waveguide media group 500 has a configuration in which substances having different nonlinear refractive indexes are disposed with a certain intervals, for example. With such a configuration, for example, a timing at which the nonlinear effect becomes apparent in response to an incidence of the strong light 153 is adjusted so that no nonlinear effect would be produced when the reflection light is located near the crystal reflection surface (the boundary surface 113) on an opposite side of the output light. Further, the above-described timing can be adjusted, for example, by an interval between the reflection surfaces and a pulse interval of the strong light 153.

Here, for example, when the thickness of the nonlinear medium 111 is set as d and the pulse propagate speed is set as v, the reflection light returns to the front reflection surface at propagate time t=d/v, so that a pulse interval T is designed as T>t. When layers are accumulated in N-steps, the propagate time N×t becomes larger than T and the reflection light can be reflected on the front layer in the N-th layer, so that the thickness of the layer is cyclically adjusted to shift the timing, or the pulse interval is made to be longer.

The prism 400d multiplexes light outputted from the prism 400c, and outputs the light to the polarization division section 1401. The polarization division section 1401 divides the light outputted from the prism 400d, and outputs the divided light to the polarization rotation section 1402 and the multiplex section 1403.

The polarization rotation section 1402 rotates the light outputted from the polarization division section 1401 by 90 degrees, and outputs the rotated light to the multiplex section 1403. The multiplex section 1403 multiplexes the light outputted from the polarization division section 1401 and the light outputted from the polarization rotation section 1402. This can make the polarization of light to be outputted be unchangeable even if the polarization rotation occurs due to an influence by the nonlinear effect in the waveguide media group 500.

Note that, as a method of outputting light with a polarization fixed in a specific direction, there is a method of regulating the polarization into one direction by causing light to pass through a fiber wound by several turns while applying a magnetic field to the fiber. Such a method, however, causes propagate delay, and might decrease the processing performance.

In the configuration of the second modification example in the second embodiment, the multiple-stage configuration allows a traveling path to be largely deflected from the optical paths 401 and 402, whereby the further apparent nonlinear effect can be obtained. Accordingly, a limiter function can be obtained without the optical signal 152 being strongly amplified in the front stage. Moreover, a propagate delay can be reduced, and lowering in processing performance can be suppressed. Moreover, the strong light 153 is not outputted to the post stage but is outputted to the outside. This can obtain an effect that the strong light 153 may not be removed.

(Third Embodiment)

Next, a third embodiment will be described. In the third embodiment, an application example of the optical limiters 100 and 1000 indicated in the first and second embodiments will be described. Note that, although a case where the optical limiter 1000 indicated in the second embodiment is applied is described in third embodiment, the same also applies to a case where the optical limiter 100 indicated in the first embodiment is applied.

(Configuration Example of Optical Limiter)

Figure 15:
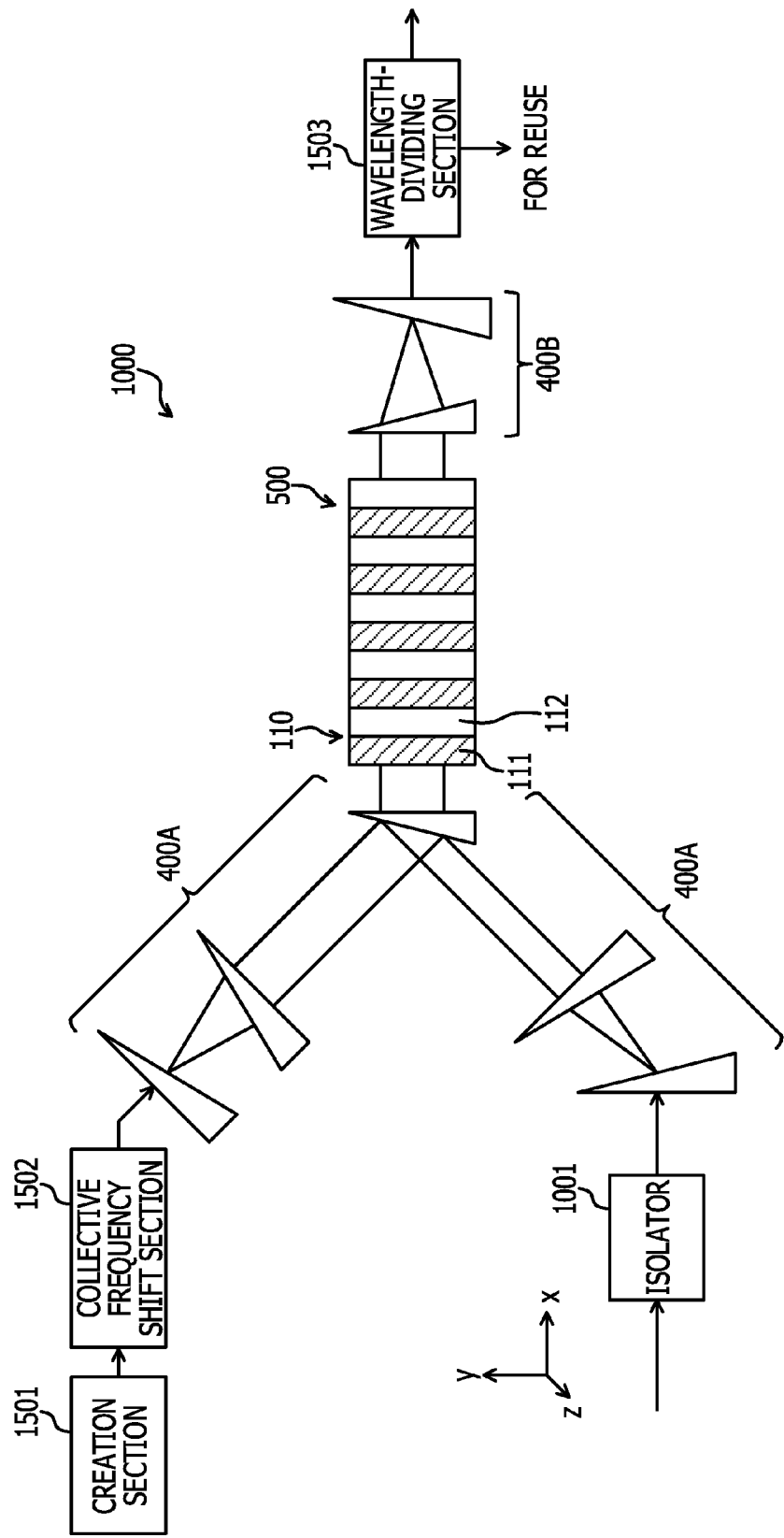
FIG. 15 is an explanation view illustrating a configuration example of an optical limiter according to a third embodiment.

FIG. 15 is an explanation view illustrating a configuration example of an optical limiter according to the third embodiment. As illustrated in FIG. 15, the optical limiter 1000 includes the isolator 1001, multiple prism groups 400A and 400B, the waveguide media group 500, a creation section 1501, a collective frequency shift section 1502, and a wavelength-dividing section 1503.

Multi-wavelength light is incident on the isolator 1001. The isolator 1001 outputs the incident light to the prism group 400A. The creation section 1501 creates the strong light 153. The detail of the creation section 1501 is described later using FIG. 18. The creation section 1501 outputs the created strong light 153 to the collective frequency shift section 1502.

The collective frequency shift section 1502 collectively shifts all the frequencies of the strong light 153 in order that all the frequencies of the strong light 153 are changed to the frequencies shifted by df, for example, from the frequencies (wavelengths) of light. The collective frequency shift section 1502 outputs the strong light 153 with the frequencies shifted to the prism group 400A.

The prism group 400A collimates rays of light outputted from the isolator 1001 and the strong light 153 outputted from the collective frequency shift section 1502, and outputs the collimated rays of light to the waveguide media group 500. Having different wavelengths (frequencies), the strong light 153 and the optical signal 152 may be deviated in space even if the rays are diffused with the same lens and irradiated after wavelength multiplexing. Accordingly, the prism group 400A diffuses and collimates each ray of light with a lens, a prism, or the like, and thereafter makes the ray positioned and incident on the waveguide media group 500. A timing of a pulse of the optical signal 152 and a timing of a pulse when the strong light 153 is a continuous pulse is described later using FIG. 17.

When light with predetermined intensity or more is incident on the waveguide media group 500, the light passes through the waveguide media group 500. The passed light is outputted to the prism group 400B. The prism group 400B multiplexes the light outputted from the waveguide media group 500, and outputs the light to the wavelength-dividing section 1503.

The wavelength-dividing section 1503 divides the light outputted from the prism group 400B into a wavelength of the optical signal 152 and a wavelength of the strong light 153. The wavelength-dividing section 1503 outputs the strong light 153 corresponding to the divided wavelength to a predetermined function section that is to reuse the strong light 153. The predetermined function section is, for example, another optical limiter 1000 that does not include a light source such as the creation section 1501, and specifically is an optical limiter 1000 in an OR logic circuit 1900 illustrated in FIGS. 19 and 20. Moreover, the wavelength-dividing section 1503 outputs the wavelength-divided optical signal 152 to the post stage.

Note that, the strong light 153 is not limited to the configuration in which the strong light 153 is made incident from the same direction as the incident direction of the optical signal 152, but may be a configuration in which the strong light 153 is made incident from the reverse direction of the incident direction of the optical signal 152. Here, the configuration in which the strong light 153 is made incident on the waveguide media group 500 from the reverse direction of the incident direction of the optical signal 152 supplementarily describes using FIG. 16.

(Configuration in which Strong Light is Made Incident on Waveguide Media Group from Reverse Direction Relative to Incident Direction of Optical Signal)

Figure 16:
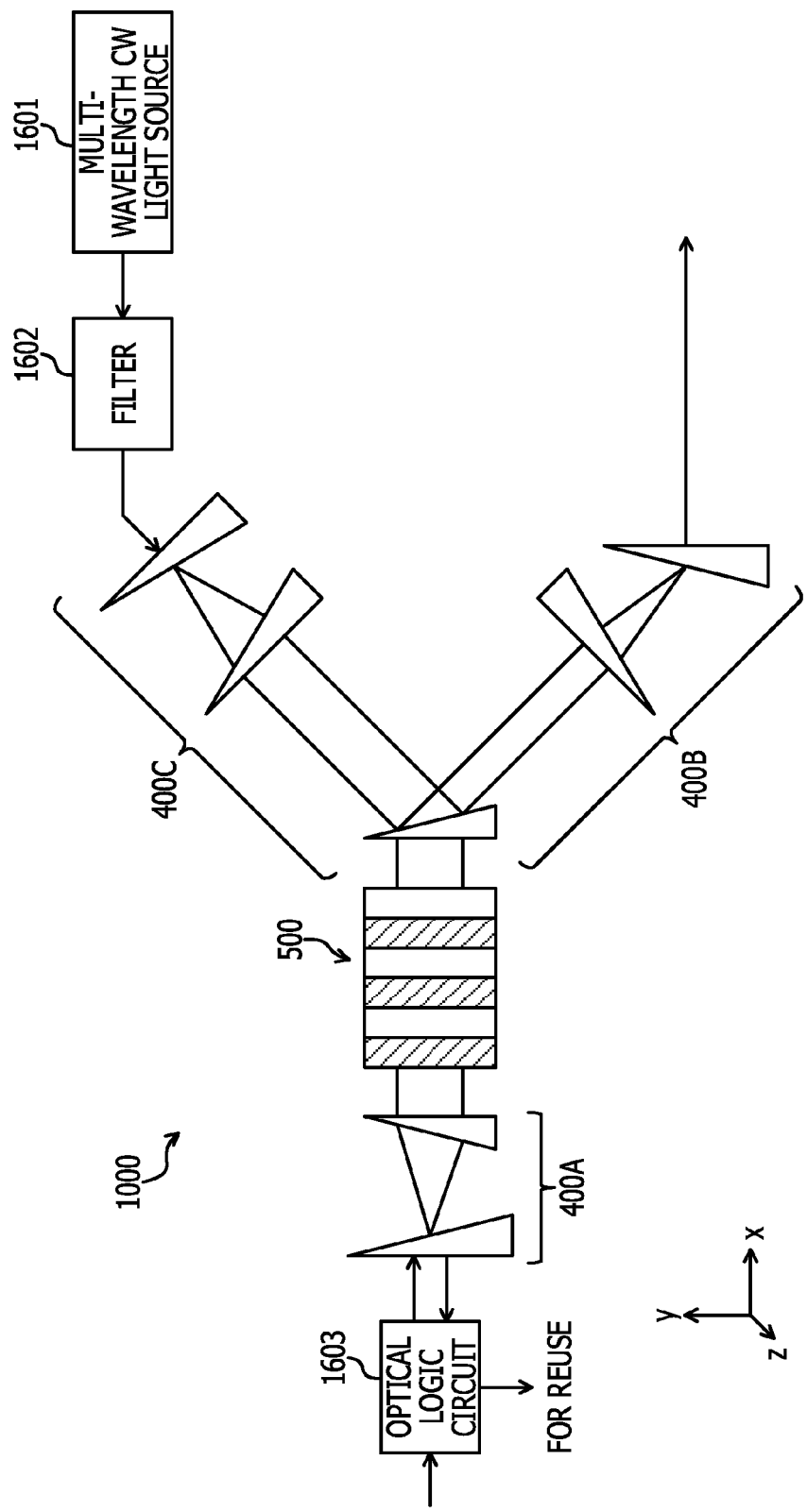
FIG. 16 is an explanation view illustrating one example of a configuration in which strong light is made incident on a waveguide media group from the reverse direction of the incident direction of an optical signal.

FIG. 16 is an explanation view illustrating one example of a configuration in which strong light is made incident on a waveguide media group from the reverse direction of the incident direction of an optical signal. As illustrated in FIG. 16, the optical limiter 1000 includes a multi-wavelength CW light source 1601, a filter 1602, an optical logic circuit 1603, and prism groups 400A, 400B, and 400C. The multi-wavelength CW light source 1601 creates multi-wavelength CW light that is strong light. The multi-wavelength CW light source 1601 outputs the created strong light to the filter 1602.

In the configuration in which strong light is made incident on the waveguide media group 500 from the reverse direction, from the viewpoint that matching timings of pulses is not requested, CW light is used instead of continuous pulse. Note that, matching timings of pulses allows a continuous pulse to be used as strong light.

The filter 1602 extracts, for example, each component of the strong light outputted from the multi-wavelength CW light source 1601 and having a wavelength shifted by df, and outputs the strong light to the prism group 400C. The prism group 400C outputs the strong light outputted from the filter 1602 to the waveguide media group 500. The optical signal 152 is incident on the optical logic circuit 1603. The optical logic circuit 1603 outputs the incident optical signal 152 to the prism group 400A. The prism group 400A outputs the optical signal 152 outputted from the optical logic circuit 1603 to the waveguide media group 500.

When the intensity of light in which the optical signal 152 outputted from the prism group 400A and the strong light outputted from the prism group 400C are combined is a predetermined value or more, the optical signal 152 outputted from the prism group 400A passes through the waveguide media group 500. The passed optical signal 152 is outputted to the prism group 400B.

The strong light outputted from the prism group 400C to the waveguide media group 500 is outputted to the prism group 400A. The prism group 400A outputs the strong light outputted from the waveguide media group 500 to the optical logic circuit 1603. The optical logic circuit 1603 outputs the strong light outputted from the prism group 400A to a predetermined function section that reuses the strong light, for example. The predetermined function section is, for example, other optical limiter 1000 that does not include a light source such as the multi-wavelength CW light source 1601, and specifically is the optical limiter 1000 in the OR logic circuit 1900 illustrated in FIGS. 19 and 20. In this manner, the configuration in which the strong light 153 is made incident on the waveguide media group 500 from the reverse direction is possible.

By use of such a configuration, the strong light 153 is incident on the nonlinear medium 111 to allow the nonlinear effect in the nonlinear medium 111 to be produced even if the intensity of the optical signal 152 is weak. This can obtain a limiter function without the optical signal 152 with a low intensity being strongly amplified in the front stage.

(Timings of Pulses of Strong Light and Optical Signal)

Figure 17:
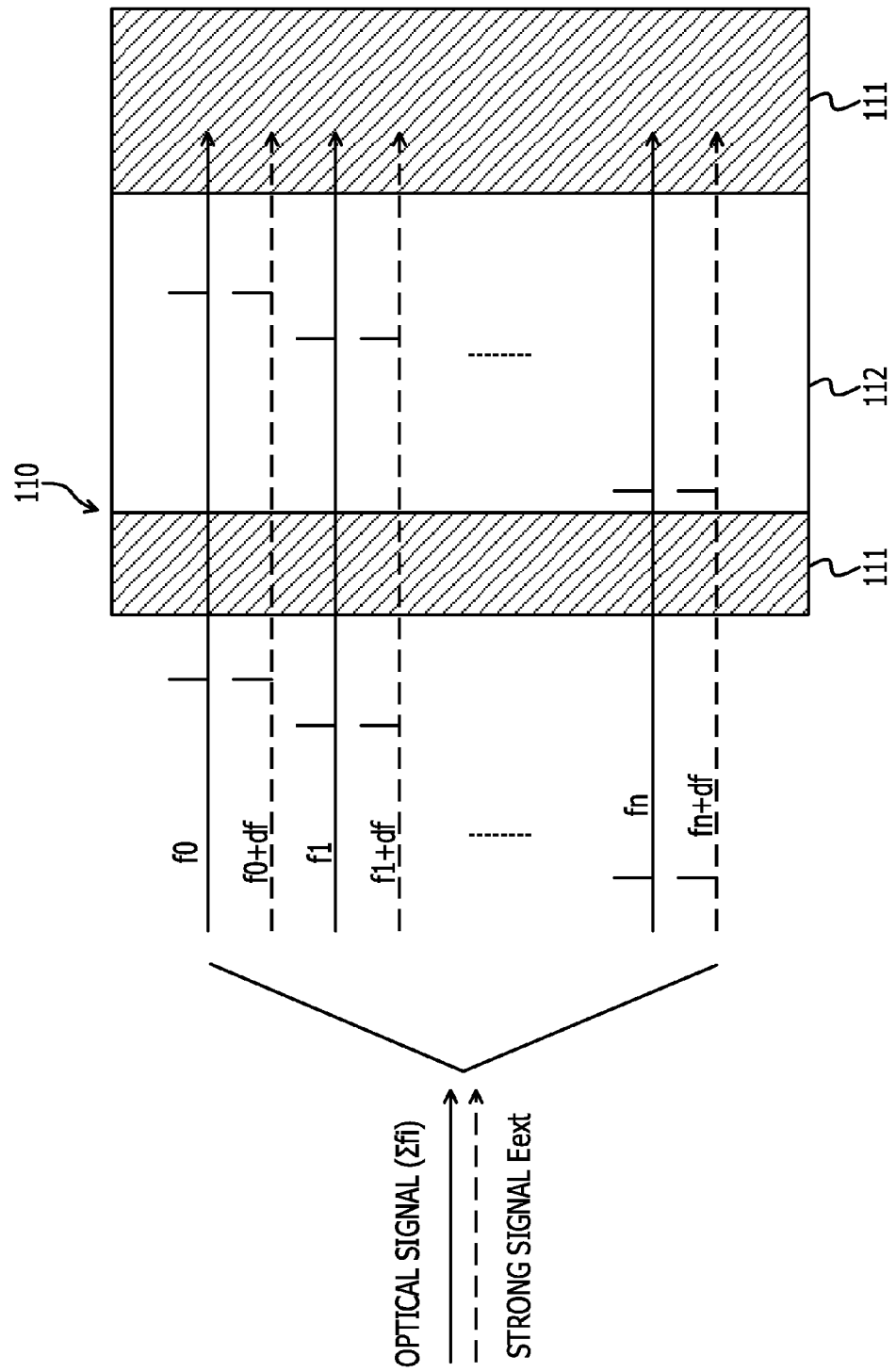
FIG. 17 is an explanation view illustrating one example of timings of pulses of strong light and an optical signal.

FIG. 17 is an explanation view illustrating one example of timings of pulses of strong light and an optical signal. Note that, an explanation in FIG. 17 is made that the strong light 153 is a continuous pulse, for example. The optical signal 152 and the strong light 153 have different wavelengths. Accordingly, lights are diffused with lenses, prisms, or the like to be collimated, and thereafter, the lights of which positions being aligned are made incident. Specifically, timings of the optical signal 152 with a frequency f0 and the strong light 153 with a frequency f0+df are matched.

Similarly, timings of the optical signal 152 with a frequency fn and the corresponding strong light 153 with a frequency fn+df are matched. This can suppress shift in space when the optical signal 152 and the strong light 153 are wavelength-multiplexed, and can collimate. Note that, although the strong light 153 is a continuous pulse in the explanation of FIG. 17, the same applies to CW light.

(One Example of Detailed Configuration of Creation Section)

Figure 18:
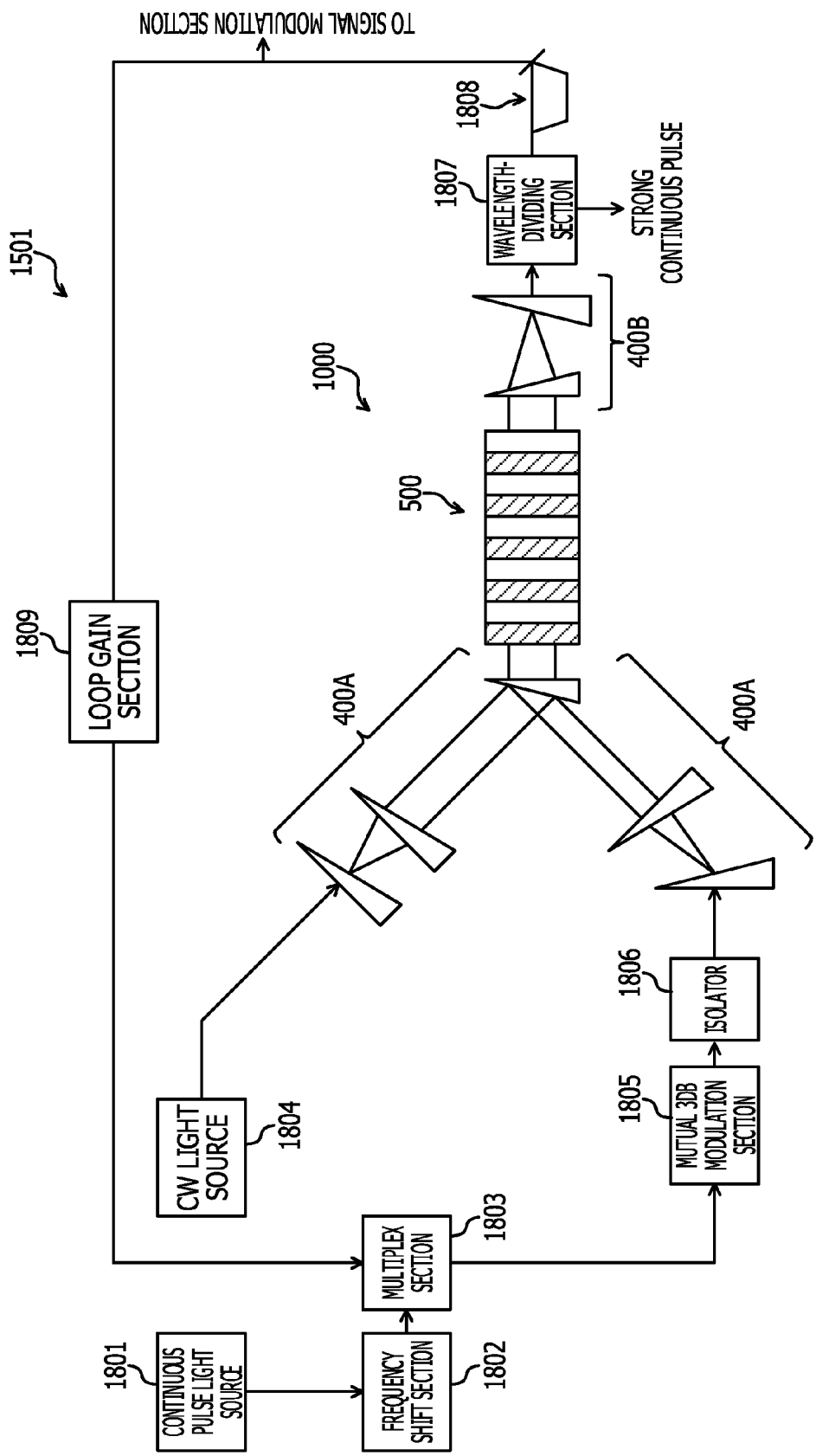
FIG. 18 is an explanation view illustrating one example of a detailed configuration of a creation section.

FIG. 18 is an explanation view illustrating one example of a detailed configuration of a creation section. As illustrated in FIG. 18, the creation section 1501 includes a continuous pulse light source 1801, a frequency shift section 1802, a multiplex section 1803, a CW light source 1804, a mutual 3dB modulation section 1805, an isolator 1806, a wavelength-dividing section 1807, an interference section 1808, a loop gain section 1809, the prism groups 400A and 400B, and the waveguide media group 500.

The continuous pulse light source 1801 creates a continuous pulse. The continuous pulse light source 1801 outputs the created continuous pulse to the frequency shift section 1802. The frequency shift section 1802 adjusts the frequency of the continuous pulse outputted from the continuous pulse light source 1801, and outputs the adjusted continuous pulse to the multiplex section 1803. The multiplex section 1803 multiplexes the continuous pulse outputted from the frequency shift section 1802 and the continuous pulse outputted from the loop gain section 1809.

The multiplex section 1803 outputs the multiplexed continuous pulse to the mutual 3dB modulation section 1805. The CW light source 1804 creates CW light, and outputs the created CW light to the prism group 400A. The mutual 3dB modulation section 1805 adjusts the level of the continuous pulse outputted from the multiplex section 1803, and outputs the level-adjusted continuous pulse to the isolator 1806. The isolator 1806 outputs the continuous pulse outputted from the mutual 3dB modulation section 1805 to the prism group 400A.

The prism group 400A collimates the CW light outputted from the CW light source 1804 and the continuous pulse outputted from the isolator 1806, and outputs the collimated light to the waveguide media group 500. When light with predetermined intensity or more is incident on the waveguide media group 500, the light passes through the waveguide media group 500. The passed light is outputted to the prism group 400B. The prism group 400B multiplexes the light outputted from the waveguide media group 500, and outputs the light to the wavelength-dividing section 1807. The wavelength-dividing section 1807 wavelength-divides the light outputted from the prism group 400B to divide the light outputted from the prism group 400B into strong light and loop light.

The strong light that is wavelength-divided by the wavelength-dividing section 1807 is used as the strong light 153 in the optical limiter 1000. Moreover, the wavelength-dividing section 1807 outputs a continuous pulse corresponding to the divided wavelength to the interference section 1808. The interference section 1808 aligns phases of all the wavelengths of the light outputted from the wavelength-dividing section 1807, and extracts only a wavelength to be used in the limiter operation.

The interference section 1808 outputs light of a specific wavelength in which only a wavelength to be used is extracted to a signal modulation section that modulates the optical signal 152. Moreover, the interference section 1808 outputs the light with a specific wavelength obtained by only extracting a wavelength to be used to the loop gain section 1809. The loop gain section 1809 amplifies light outputted from the interference section 1808, and outputs the light to the multiplex section 1803. In this manner, the creation section 1501 can create the strong light 153, and can create a pulse for modulating the optical signal 152. The strong light 153 created by the creation section 1501 can be used for the optical limiters 100 and 1000 indicated in the first and second embodiments.

In this manner, the strong light 153 can be created, and the strong light 153 can be used in common in the optical limiters 100 and 1000. Accordingly, a limiter function can be obtained without the optical signal 152 being amplified, so that power consumption can be suppressed. Moreover, in a configuration in which the strong light 153 is used to implement the limiter function, warp is unlikely to be generated in a signal, so that an effect that adjustment of the warp may not be performed can be obtained.

(Configuration Example of OR Logic Circuit Using Optical Limiter)

Figure 19:
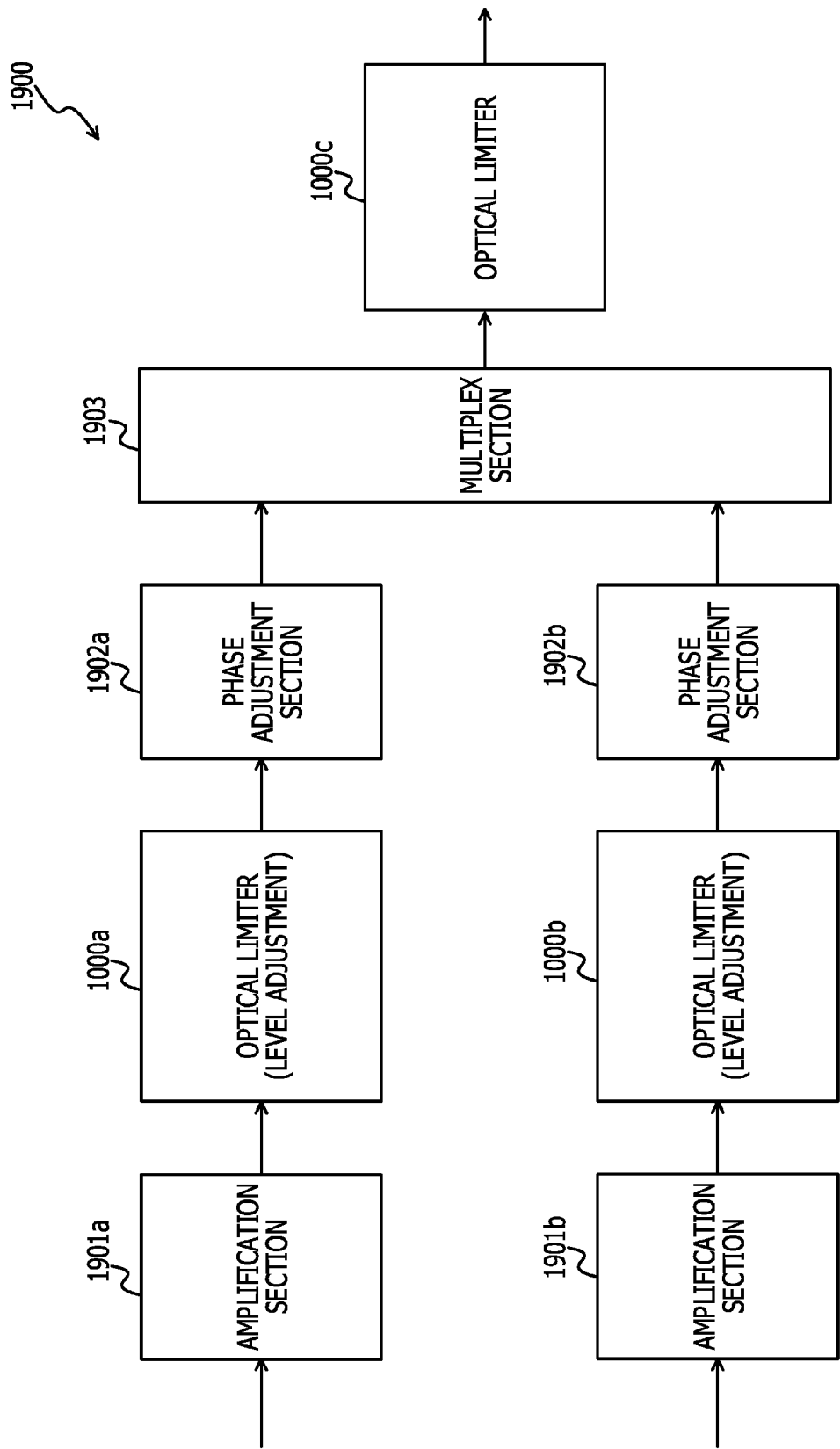
FIG. 19 is an explanation view illustrating a configuration example of an OR logic circuit using an optical limiter.

FIG. 19 is an explanation view illustrating a configuration example of an OR logic circuit using an optical limiter. As illustrated in FIG. 19, the OR logic circuit 1900 includes amplification sections 1901 (1901a, 1901b), phase adjustment sections 1902 (1902a, 1902b), a multiplex section 1903, and optical limiters 1000 (1000a, 1000b, 1000c). The optical limiters 1000 (1000a, 1000b, 1000c) are not limited to the optical limiter indicated in the second embodiment, but the optical limiter 100 indicated in the first embodiment can be used.

The optical signal 152 is incident on the amplification section 1901a (1901b). The amplification section 1901a (1901b) amplifies the optical signal 152 in such a manner that a level when the incident optical signal 152 is "1" becomes a reference level or more, and outputs the amplified optical signal 152 to the optical limiter 1000a (1000b).

Moreover, the optical limiter 1000a (1000b) adjusts the level in such a manner that an emitted signal outputted from the amplification section 1901a (1901b) does not become "1" or more, and outputs the optical signal 152 indicating "0" or "1" to the phase adjustment section 1902a (1902b). Note that, the OR logic circuit 1900 may be configured to provide no amplification section 1901a (1901b) when using the optical limiter 100 that can obtain an amplification effect that changes a non-uniform pulse to be a uniform pulse, instead of the optical limiter 1000a (1000b).

The phase adjustment section 1902a and the phase adjustment section 1902b adjust the phases of the optical signals 152 outputted from the optical limiters 1000a and 1000b to be mutually matched. The phase adjustment section 1902a (1902b) outputs the optical signal 152 of which phase is adjusted to the multiplex section 1903. The phase adjustment section 1902a and the phase adjustment section 1902b can be individually implemented, for example, by light fibers in which lengths of waveguides are matched.

The multiplex section 1903 multiplexes the multiple optical signals 152 with the modulated intensity. Specifically, the multiplex section 1903 multiplexes the optical signals 152 outputted from the phase adjustment section 1902a (1902b), and outputs the multiplexed optical signal 152 to the optical limiter 1000c. The multiplex section 1903 outputs a signal any of "0", "1", or "2", for example, to the optical limiter 1000c.

The optical limiter 1000c coverts the optical signal 152 outputted from multiplex section 1903 into the optical signal 152 "0" or "1". With the above-described limiter function, for example, the optical limiter 1000c outputs the optical signal 152 of "0" if the optical signal 152 outputted from the multiplex section 1903 is "0", and outputs the optical signal 152 of "1" if it is "1" or "2". Any optical logic circuit can be implemented by using such an OR logic circuit to be combined with a NOT circuit. Here, one example of an optical logic circuit that uses will be described hereinafter using FIG. 20.

(Configuration Example of Optical Logic Circuit Using OR Logic Circuit)

Figure 20:
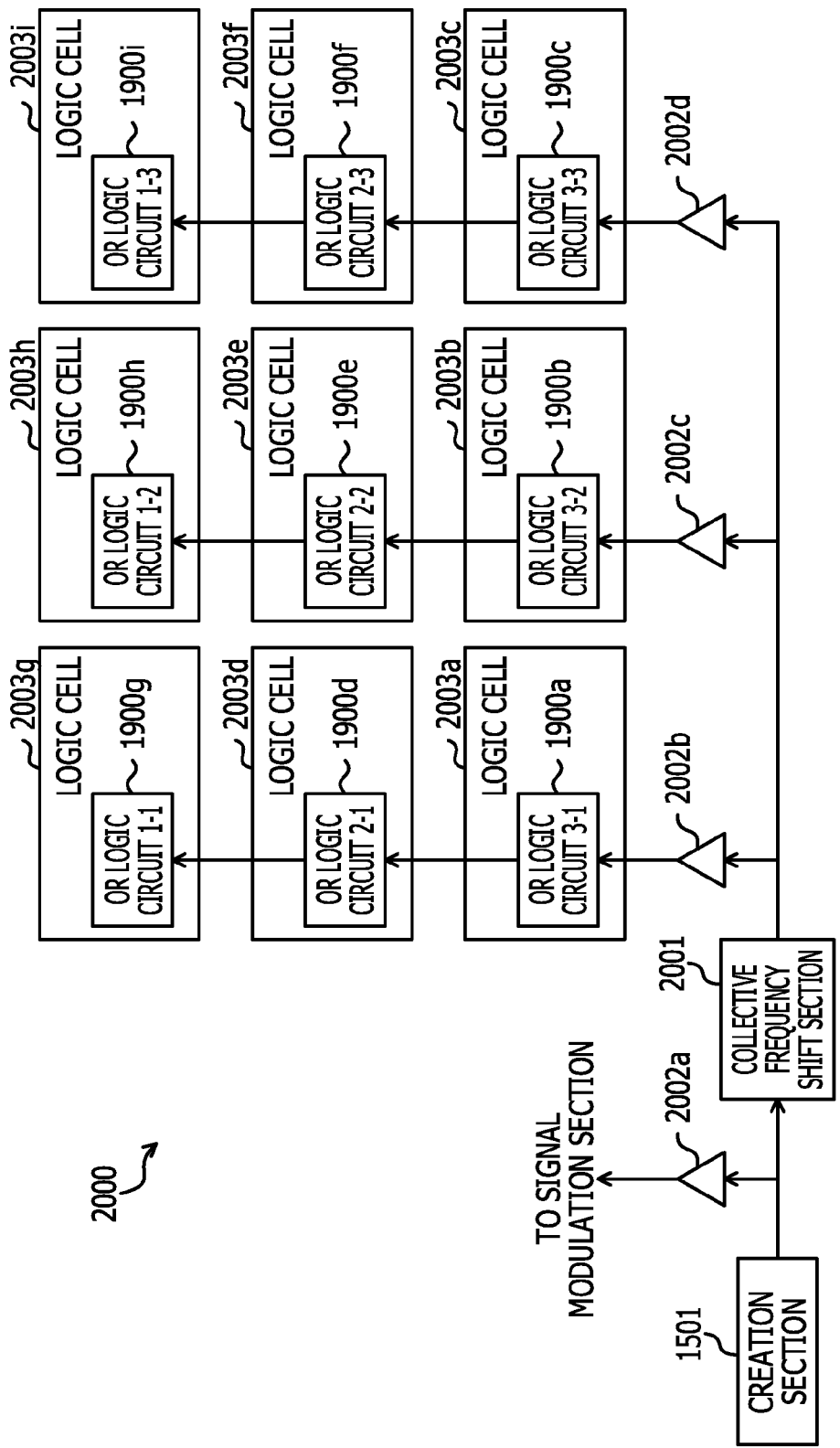
FIG. 20 is an explanation view illustrating a configuration example of an optical logic circuit using an OR logic circuit.

FIG. 20 is an explanation view illustrating a configuration example of an optical logic circuit using an OR logic circuit. In FIG. 20, a configuration including a first optical limiter (for example, logic cell 2003a) that causes the strong light 153 created by the creation section 1501 to be incident, and a second optical limiter (for example, logic cell 2003b) that causes the strong light 153 outputted from the first optical limiter made incident is illustrated.

As illustrated in FIG. 20, an optical logic circuit 2000 includes the creation section 1501, a collective frequency shift section 2001, multiple amplifiers 2002*a*, 2002*b*, 2002*c*, and 2002*d*, and multiple logic cells 2003. The creation section 1501 creates the strong light 153, and outputs the created strong light 153 to the collective frequency shift section 2001 and the amplifier 2002*a*.

The amplifier 2002*a* amplifies light of a specific length outputted from the creation section 1501, and outputs the light to the signal modulation section. For example, the signal modulation section modulates the optical signal 152 using the pulse created by the creation section 1501. The optical signal 152 modulated in the signal modulation section is processed in the logic cells 2003. In other words, in the signal modulation section that modulates the optical signal 152 and the logic cells 200 that process the optical signal 152, the common light source created in the creation section 1501 is used. In this manner, using the one light source allows the phases to be aligned.

The collective frequency shift section 2001 simultaneously shifts all the frequencies of the continuous pulse outputted from the creation section 1501 by a predetermined amount. The collective frequency shift section 2001 outputs the continuous pulse with the shifted frequencies to the amplifier 2002*b*, 2002*c*, and 2002*d*. The amplifier 2002*b* (2002*c*, 2002*d*) amplifies the strong light 153 outputted from the collective frequency shift section 2001 and outputs the amplified light to the logic cells 2003*a* (2003*b*, 2003*c*).

The logic cell 2003*a* (2003*b*, 2003*c*) includes the OR logic circuit 1900*a* (1900*b*, 1900*c*), and executes predetermined processing using the strong light 153 outputted from the amplifier 2002*b* (2002*c*, 2002*d*). The logic cell 2003*a* (2003*b*, 2003*c*) outputs the strong light 153 used in the predetermined processing to the logic cell 2003*d* (2003*e*, 2003*f*) in the lower stage.

The logic cell 2003*d* (2003*e*, 2003*f*) executes predetermined processing using the strong light 153 outputted from the logic cell 2003*a* (2003*b*, 2003*c*) and common to the logic cell 2003*a* (2003*b*, 2003*c*). The logic cell 2003*d* (2003*e*, 2003*f*) outputs the strong light 153 used in the predetermined processing to the logic cell 2003*g* (2003*h*, 2003*i*) in the lower stage.

The logic cell 2003*g* (2003*h*, 2003*i*) executes predetermined processing using the strong light 153 outputted from the logic cell 2003*d* (2003*e*, 2003*f*) and common to the logic cell 2003*d* (2003*e*, 2003*f*).

With the third embodiment, the strong light 153 can be used in common in the OR logic circuit 1900 (the optical limiter 1000) of each of the logic cells 2003. In other words, the strong light 153 can be supplied for each OR logic circuit 1900 to align phases, and the strong light 153 can be reused. Moreover, with the third embodiment, compared with a case in which multiple logic circuits are used to amplify the optical signals 152 and to obtain the nonlinear effect, a simple control as a whole can be realized and power consumption can be reduced.

Note that, the creation section 1501 is not limited to configure to be independently disposed, but may be configured to be included in one logic cell 2003, for example. In this case, the optical logic circuit 2000 may be configured such that the strong light 153 created by the creation section 1501 included in one logic cell 2003 is commonly used in other logic cells 2003. Moreover, the optical logic circuit 2000 can be configured such that multiple OR logic circuits 1900 are provided in the same logic cell 2003, and the strong light 153 is used in common in the multiple OR logic circuits 1900.

(Fourth Embodiment)

Next, a fourth embodiment will be described. In the fourth embodiment, an application example the optical limiters 100 and 1000 indicated in the first and second embodiments will be described.

(Configuration Example of Digital Converter Using Optical Limiter)

Figure 21:
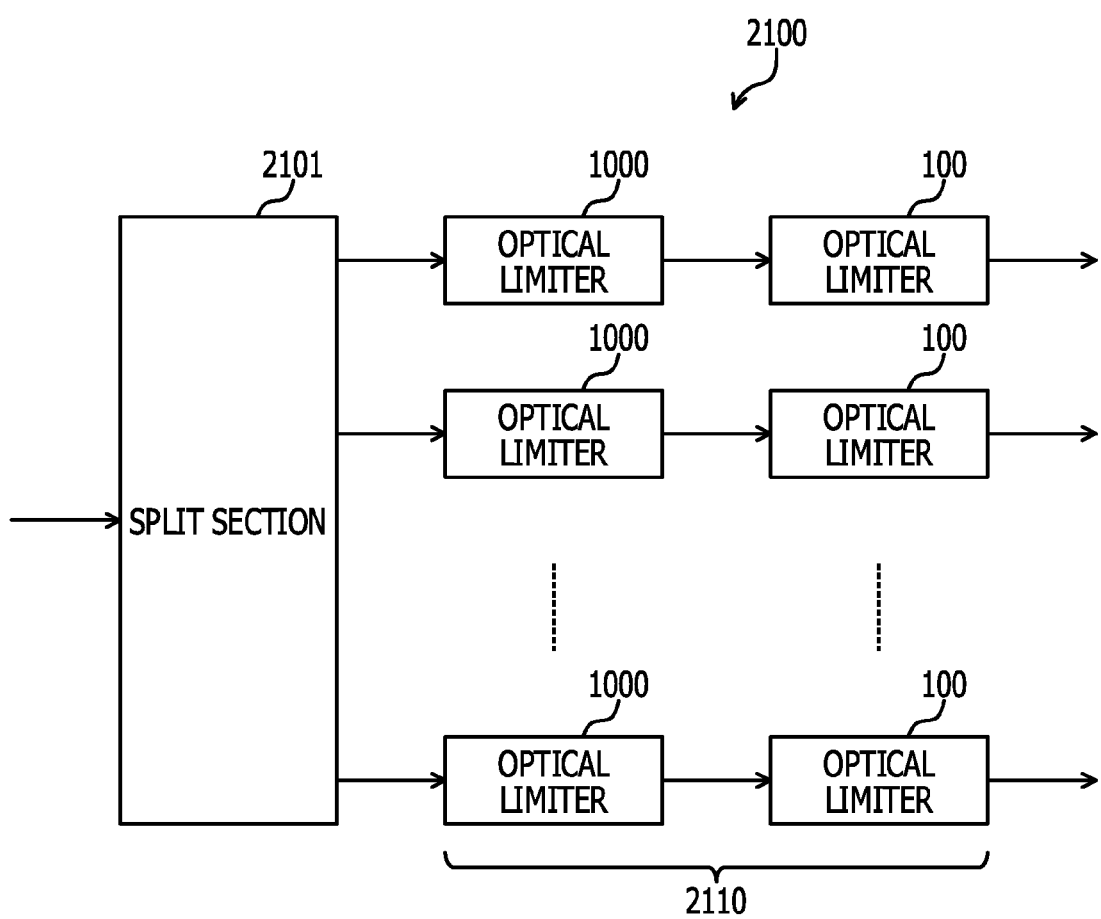
FIG. 21 is an explanation view illustrating a configuration example of a digital converter using an optical limiter.

FIG. 21 is an explanation view illustrating a configuration example of a digital converter using an optical limiter. As illustrated in FIG. 21, a digital converter 2100 includes a split section 2101 and a comparator 2110. The comparator 2110 includes the optical limiter 1000 and the optical limiter 100. The optical limiter 100 has the configuration explained in the first embodiment, and the optical limiter 1000 has the configuration explained in the second embodiment. A continuous pulse is incident on the split section 2101. Here, a detailed configuration of the split section 2101 will be described.

Figure 22:
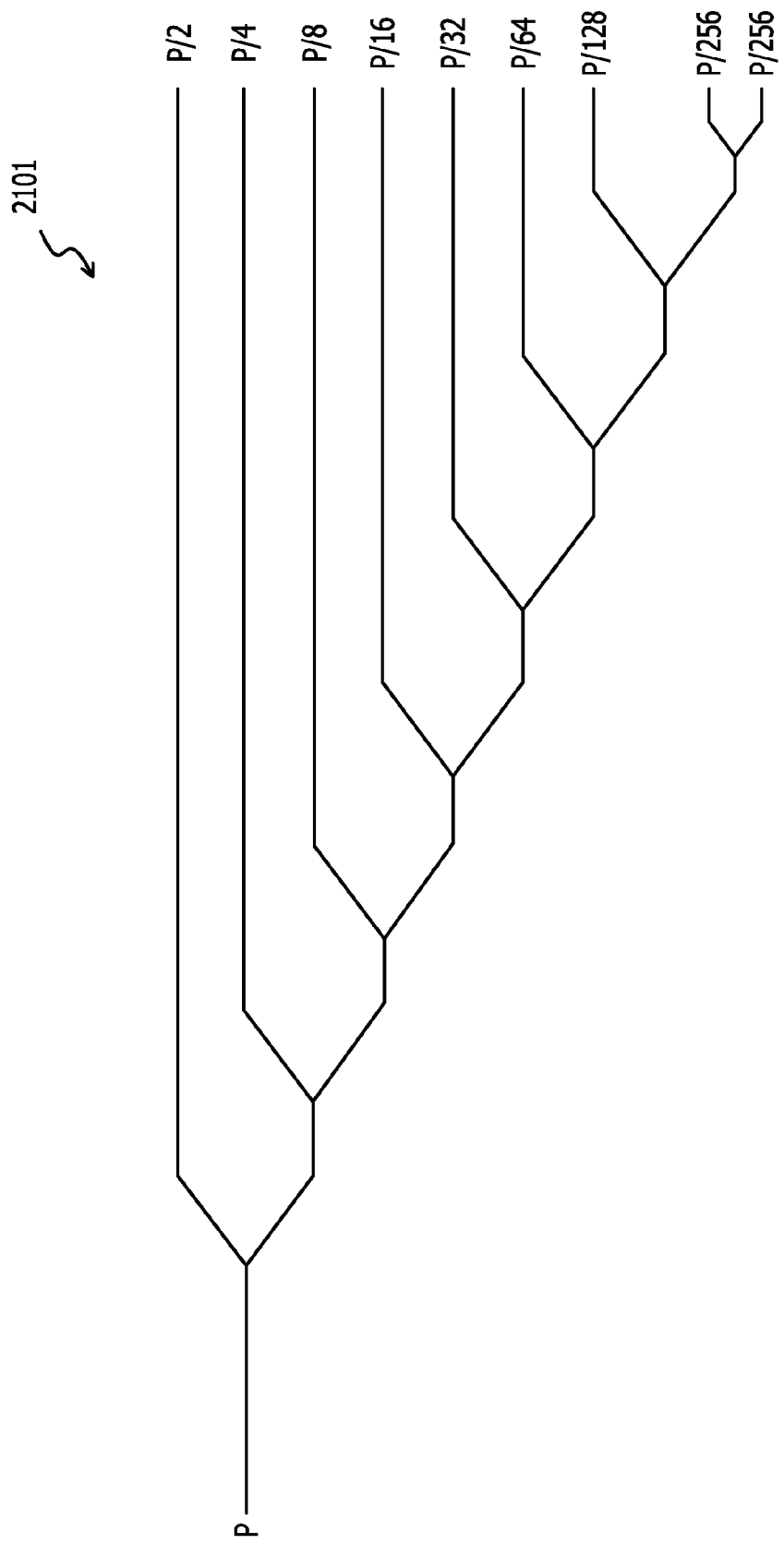
FIG. 22 is an explanation view illustrating one example of a detailed configuration of a split section.

FIG. 22 is an explanation view illustrating one example of a detailed configuration of a split section. As illustrated in FIG. 22, the split section 2101 splits a power P of the incident light by 1:1 into powers having different split ratios. The split section 2101 outputs the light with split power to the optical limiter 1000.

Referring back to FIG. 21, among the light having the power P outputted from the split section 2101, the optical limiter 1000 outputs light with a certain intensity or higher to the optical limiter 100 in the post stage. Here, the optical limiter 1000 has a characteristic in which if incident light has a certain power (p2) or more, the optical limiter 1000 allows the light to pass therethrough as illustrated in FIG. 11. Moreover, the optical limiter 100 has a characteristic in which if the incident light has a specific power (p1), the optical limiter 100 allows the light to pass therethrough as illustrated in FIG. 3.

Accordingly, the digital converter 2100 can pass, out of the light or each power split by the split section 2101, the light therethrough when the power is the power (p1) or more set by the optical limiter 100 in the post stage. This enables the digital converter 2100 to convert a continuous pulse of an incident analog signal into a digital signal, for example.

Note that, although the digital converter 2100 is configured such that with different split ratios, light of a threshold value (p1) or more is passed through the comparators 2110, the configuration is not limited thereto. Alternatively, with the same split ratio, a configuration in which the comparators 2110 have different threshold values is possible.

Note that, the optical limiter 1000 in the front stage may be, for example, an optical limiter as long as the optical limiter has a characteristic that the transmittance in a range (range in which the incident light power is p2 or more in FIG. 11) of incident light with a high intensity is smaller than the transmittance in a range (range in which the incident light power is less than p2 in FIG. 11) of the incident light with a low intensity. For example, when an optical signal incident on the digital converter 2100 is an optical signal of one wavelength, a semiconductor light amplifier in a gain saturated state can be used, instead of the optical limiter 1000 in the front stage. A configuration in which a digital value is returned to an analog value can be implemented by merely a configuration in which the intensity corresponding to a bit of each digital value and corresponding to the order of the light power is adjusted and added.

(Modification Example of Fourth Embodiment)

Next, a modification example in the fourth embodiment will be described. In the modification example in fourth embodiment, an application example of the comparator 2110 indicated in the fourth embodiment will be described.

Figure 23:
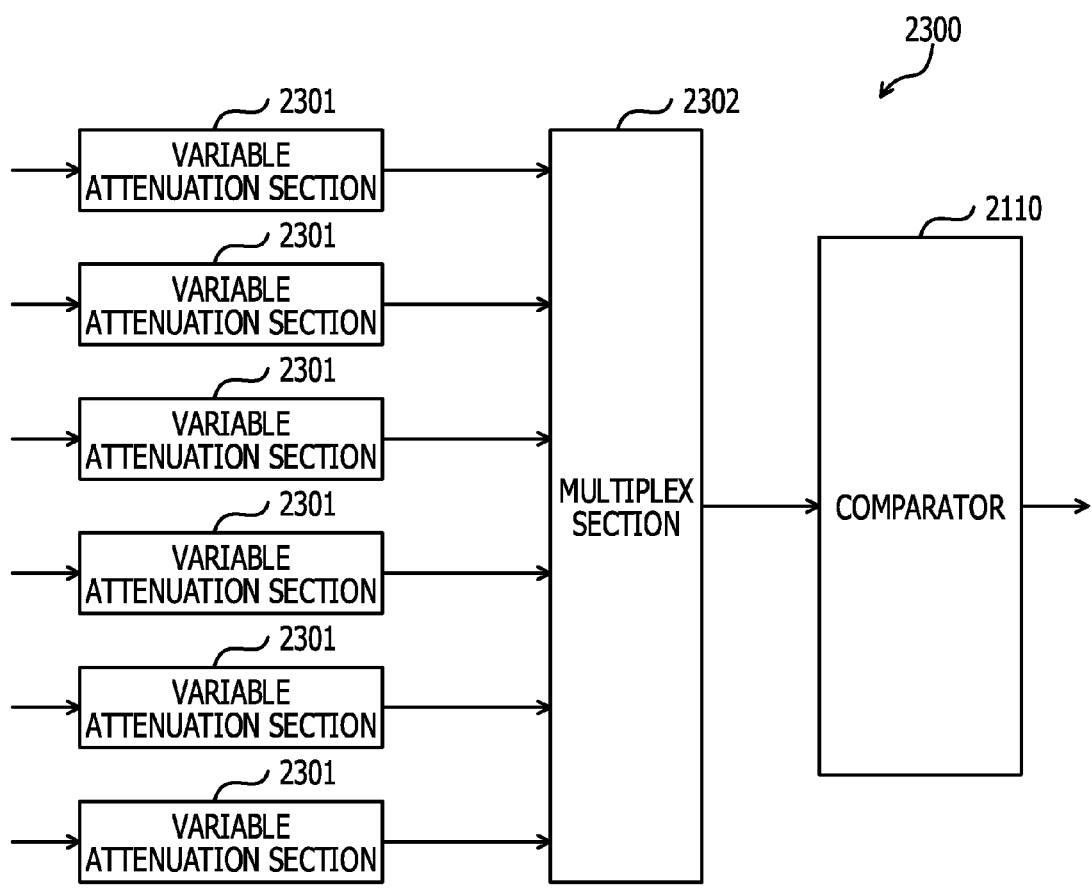
FIG. 23 is an explanation view illustrating an application example of a comparator.

FIG. 23 is an explanation view illustrating an application example of a comparator. In the fourth embodiment, a case where the comparator 2110 is applied to an optical neuron 2300 will be described. As illustrated in FIG. 23, the optical neuron 2300 includes variable attenuation sections 2301 corresponding to weighting to inputs, a multiplex section 2302, and the comparator 2110. The variable attenuation section may correspond to a weight, and actually may be an amplification unit. Further, a method in which the configuration of the above-described optical limiter 100 or the optical limiter 1000 is used to adjust the intensity of strong light from the outside, thereby adjusting the attenuation ratio, can be used. The optical signal 152 is incident on the variable attenuation section 2301. The variable attenuation sections 2301 attenuate the incident optical signals 152 by a predetermined amount, for example. The variable attenuation sections 2301 output the attenuated optical signals 152 to the multiplex section 2302.

The multiplex section 2302 multiplexes the optical signals 152 outputted from the variable attenuation sections 2301. The multiplex section 2302 outputs the multiplexed optical signal 152 to the comparator 2110. The comparator 2110 compares the optical signal 152 outputted from the multiplex section 2302, and can pass the light therethrough when a power thereof is a power (p1) set by the optical limiter 100 in the post stage in the comparator 2110 or more.

With the modification example in fourth embodiment, the optical neurons 2300 are connected to allow an optical neuro computer to be configured, so that an artificial intelligence that thinks at propagate speed of light can be implemented.

(Fifth Embodiment)

Next, a fifth embodiment will be described. In the fifth embodiment, one example in which the optical limiter 100 indicated in the first embodiment is applied to an optical transmission apparatus will be described.

(Application Example of Optical Limiter to Optical Transmission Apparatus)

Figure 24:
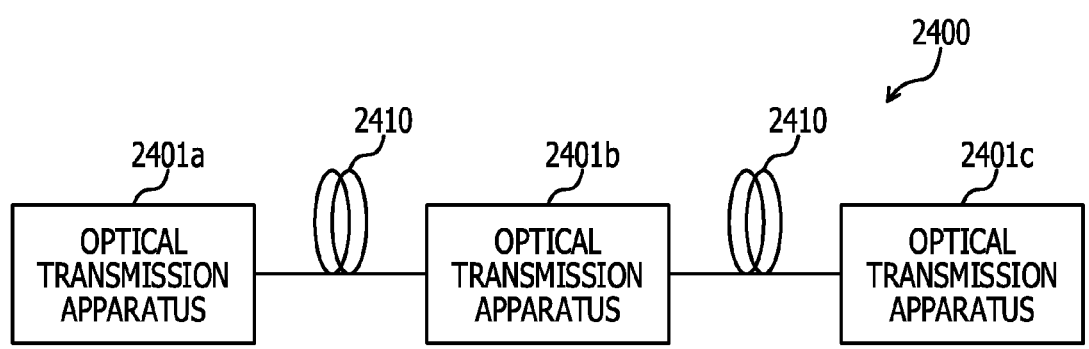
FIG. 24 is an explanation view illustrating an application example of an optical limiter to an optical transmission apparatus.

FIG. 24 is an explanation view illustrating an application example of an optical limiter to an optical transmission apparatus. As illustrated in FIG. 24, a light transmission system 2400 includes optical transmission apparatuses 2401a, 2401b, and 2401c, and optical transmission lines 2410. The optical transmission apparatus 2401a, optical transmission apparatus 2401b, and optical transmission apparatus 2401c are connected to one another via the optical transmission lines 2410, and transmit and receive optical signals. The optical transmission apparatus 2401b regenerative repeats the optical signal transmitted and received between the optical transmission apparatus 2401a and the optical transmission apparatus 2401c. In the light transmission system 2400, the longer the length of the optical transmission line 2410 is, the more the optical signal in the optical transmission line 2410 is deteriorated.

The optical transmission apparatuses 2401a, 2401b, and 2401c include the optical limiters 100. Here, a case where an optical signal is transmitted via the optical transmission apparatus 2401b from the optical transmission apparatus 2401a to the optical transmission apparatus 2401c will be described. In this case, in the optical limiter 100 of the optical transmission apparatus 2401b, an optical signal transmitted from the optical transmission apparatus 2401a as the optical signal 152 illustrated in FIG. 1 is incident on the waveguide medium 110. Moreover, the optical transmission apparatus 2401b transmits, for example, an optical signal of the reference level outputted from the optical limiter 100 of the optical transmission apparatus 2401b, to the optical transmission apparatus 2401c.

As described the above, even when the optical signal 152 is a non-uniform pulse, the optical limiter 100 can generate inconsistencies in refractive indexes based on the presence or absence of a data pulse. This can obtain uniform pulse data in the straight ahead direction. In other words, the optical limiter 100 can perform a transfer in which the optical signal 152 at a different level is made to data of the reference level. This can obtain an effect of optical amplification similar to an optical transistor operation.

For example, the optical limiter 100 is applied to the optical transmission apparatus 2410 to allow 3R regenerative repeating including Re-generation, Re-shaping, and Re-timing to be implemented.

Accordingly, the optical transmission apparatuses 2401a, 2401b, and 2401c that include the optical limiters 100 can regenerate an optical signal of which waveform is deteriorated in the optical transmission line 2410 to an original waveform as light without the optical signal being converted to an electric signal. In this manner, with respect to a problem that the waveform of an optical signal is deteriorated in the optical transmission line 2410, the optical transmission apparatuses 2401a, 2401b, and 2401c can obtain an effect that the waveform of the optical signal can be regenerated by the nonlinear effect.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical limiter comprising:
   a nonlinear medium that changes its own refractive index in accordance with an intensity of incident light, and outputs the incident light in a different direction depending on the refractive index;
   a first incident section by which reference light with a predetermined intensity and an optical signal with a modulated intensity is made incident on the nonlinear medium;
   a second incident section by which auxiliary light is made incident on a portion in the nonlinear medium through which the reference light and the optical signal pass; and
   an inverse output section that is provided at an incident position of the reference light outputted from the nonlinear medium when the optical signal is off, and outputs an optical signal obtained by inversion of the intensity of the incident light,
   wherein the reference light, the optical signal, and the auxiliary light are generated by one or more light sources.

2. The optical limiter according to claim 1,
   wherein the auxiliary light has a wavelength or polarization direction different from that of the reference light,
   the second incident section makes the auxiliary light incident from the same direction as an incident direction by the first incident section, and the optical limiter further comprises a remove section that removes the auxiliary light from the light outputted from the nonlinear medium when the optical signal is off.

3. The optical limiter according to claim 1, wherein the second incident section makes the auxiliary light incident from a direction different from an incident direction by the first incident section.

4. The optical limiter according to claim 1, further comprising a linear medium that has a nonlinear effect smaller than that of the nonlinear medium, and is disposed in series with the nonlinear medium along a traveling direction of the reference light and the optical signal,
wherein the linear medium outputs the light, which is outputted from the nonlinear medium when the optical signal is off, in a parallel direction with an incident direction of the light incident on the nonlinear medium, and
the inverse output section is provided at an incident position of the reference light outputted from the linear medium when the optical signal is off.

5. The optical limiter according to claim 4, wherein the linear medium is disposed in contact with the nonlinear medium.

6. The optical limiter according to claim 1, further comprising a media group in which a plurality of the nonlinear media are disposed in series along a traveling direction of the reference light and the optical signal, wherein
the first incident section makes the reference light and the optical signal incident on the media group,
the second incident section makes the auxiliary light incident on each of the nonlinear media in the media group, and
the inverse output section is provided at an incident position of the reference light outputted from the media group.

7. The optical limiter according to claim 6,
wherein the media group is a media group in which a plurality of pairs each including the nonlinear medium and a linear medium having nonlinear effect smaller than that of the nonlinear medium are disposed in series along the traveling direction of the reference light and the optical signal, and
the linear medium outputs the light, which is outputted from the nonlinear medium when the optical signal is off, in a parallel direction with an incident direction of the light on the nonlinear medium.

8. The optical limiter according to claim 1, further comprising a reflection restriction section that is provided at an incident position of the optical signal outputted from the nonlinear medium when the optical signal is on, and suppresses reflection of the incident light.

9. The optical limiter according to claim 1,
wherein the first incident section wavelength-divides each of the reference light and the optical signal and makes the resultant light incident on the nonlinear medium, and
the second incident section makes the auxiliary light incident on a portion in the nonlinear medium through which wavelength-divided wavelength components of the reference light and the optical signal pass, and
the optical limiter further comprises a multiplex section that is provided at an incident position of the wavelength components of the reference light outputted from the nonlinear medium when the optical signal is off, and is configured to multiplex incident light and output the multiplexed light to the inverse output section.

10. The optical limiter according to claim 9, wherein the second incident section makes the auxiliary light incident on the nonlinear medium from a direction different from a direction on a plane including optical paths of the wavelength components of the reference light outputted from the nonlinear medium.

11. The optical limiter according to claim 10, wherein the nonlinear medium outputs the optical signal in a direction different from the direction on the plane including the optical paths of the wavelength components of the reference light outputted from the nonlinear medium.

12. An optical transmission apparatus that regenerates and repeats an optical signal with a modulated intensity transmitted via an optical transmission line, the optical transmission apparatus comprising:
a nonlinear medium that changes its own refractive index in accordance with an intensity of incident light, and outputs the incident light in a different direction depending on the refractive index of the nonlinear medium;
a first incident section by which reference light with a predetermined intensity and the optical signal is made incident on the nonlinear medium;
a second incident section by which auxiliary light is made incident on a portion in the nonlinear medium through which the reference light and the optical signal pass; and
an inverse output section that is provided at an incident position of the reference light outputted from the nonlinear medium when the optical signal is off, and outputs an optical signal obtained by inversion of an intensity of the incident light,
wherein the reference light, the optical signal, and the auxiliary light are generated by one or more light sources.

13. An optical processing method comprising:
causing a first incident section to make reference light with a predetermined intensity and an optical signal with a modulated intensity incident on a nonlinear medium that changes its own refractive index in accordance with an intensity of incident light and outputs the incident light in a different direction depending on the refractive index;
causing a second incident section to make auxiliary light incident on a portion in the nonlinear medium through which the reference light and the optical signal pass; and
causing an inverse output section to output an optical signal obtained by inversion of an intensity of the incident light, the inverse output section being provided at an incident position of the reference light outputted from the nonlinear medium when the optical signal is off,
wherein the reference light, the optical signal, and the auxiliary light are generated by one or more light sources.

* * * * *